US006912668B1

(12) United States Patent
Brown et al.

(10) Patent No.: US 6,912,668 B1
(45) Date of Patent: *Jun. 28, 2005

(54) METHODS AND SYSTEMS FOR IMPLEMENTING SHARED DISK ARRAY MANAGEMENT FUNCTIONS

(75) Inventors: William P. Brown, Bellevue, WA (US); Michael B. Mathews, Kirkland, WA (US)

(73) Assignee: YottaYotta, Inc., Edmonton (CA)

( * ) Notice: Subject to any disclaimer, the term of this patent is extended or adjusted under 35 U.S.C. 154(b) by 923 days.

This patent is subject to a terminal disclaimer.

(21) Appl. No.: 09/657,258

(22) Filed: Sep. 7, 2000

Related U.S. Application Data

(63) Continuation of application No. 09/261,906, filed on Mar. 3, 1999, now Pat. No. 6,148,414.
(60) Provisional application No. 60/101,742, filed on Sep. 24, 1998.

(51) Int. Cl.$^7$ ............................................... G06F 11/00
(52) U.S. Cl. ..................... 714/6; 714/5; 714/9; 714/11; 714/12
(58) Field of Search ............................. 714/5, 6, 9, 11, 714/12

(56) References Cited

U.S. PATENT DOCUMENTS

| 5,611,049 A | 3/1997 | Pitts |
| 5,657,468 A | 8/1997 | Stallmo et al. |
| 5,758,085 A | 5/1998 | Kouoheris et al. |

(Continued)

FOREIGN PATENT DOCUMENTS

| WO | WO 02/08899 A2 | 1/2002 |
| WO | WO 02/13033 A1 | 2/2002 |

OTHER PUBLICATIONS

"Storage Virtualization", Storage Virtualization Brief, *VERITAS Software Corporation*, pp. 1–19 (Apr. 2001).

"VERITAS SANPoint Foundation Suite HA Sharing Data in Storage Area Networks," *VERITAS Software Corporation*, pp. 1–18 (Jan. 2001).

Sosinsky, B., "The Business Value of Virtual Volume Management", *VERITAS Software Corporation*, pp. 1–12 (Oct. 2001).

Winett, B.; Silicon Storage Applicances *Implementation Advantage, DataDirect Networks, Inc.*, pp. 1–13 (Jun. 2001, Rev. Nov. 30, 2001).

Woolery, R., "DataDirect Netorks' Silicon Storage Appliance Enabling Storage Networks," *DataDirect Netorsk, Inc.*, pp. 1–10.

*Primary Examiner*—Robert Beausoliel
*Assistant Examiner*—Michael Maskulinski
(74) *Attorney, Agent, or Firm*—Gerald T. Gray; Townsend and Townsend and Crew LLP

(57) ABSTRACT

Multiple Array Management Functions (AMFs) are connected to multiple redundancy groups over a storage area network (SAN), such as a fiber-channel based SAN. The multiple AMFs share management responsibility of the redundancy groups, each of which typically includes multiple resources spread over multiple disks. The AMFs provide concurrent access to the redundancy groups for associated host systems. When a host requests an AMF to perform an operation on a resource, the AMF synchronizes with the other AMFs sharing control of the redundancy group that includes the resource to be operated on, so as to obtain a lock on the resource. While performing the operation, the AMF send replication data and state information associated with the resource such that if the AMF fails, any of the other AMFs are able to complete the operation and maintain data reliability and coherency.

27 Claims, 19 Drawing Sheets

U.S. PATENT DOCUMENTS

| | | | | |
|---|---|---|---|---|
| 5,862,312 A | * | 1/1999 | Mann et al. | 714/6 |
| 5,875,456 A | | 2/1999 | Stallmo et al. | |
| 6,052,759 A | | 4/2000 | Stallmo et al. | |
| 6,085,234 A | | 7/2000 | Pitts | |
| 6,112,206 A | | 8/2000 | Morris et al. | |
| 6,138,247 A | * | 10/2000 | McKay et al. | 714/10 |
| 6,148,414 A | * | 11/2000 | Brown et al. | 714/9 |
| 6,151,297 A | | 11/2000 | Congdon et al. | |
| 6,192,411 B1 | | 2/2001 | Chan et al. | |
| 6,216,173 B1 | | 4/2001 | Jone et al. | |
| 6,243,829 B1 | * | 6/2001 | Chan | 714/7 |
| 2001/0049740 A1 | | 12/2001 | Karpoff | |

* cited by examiner

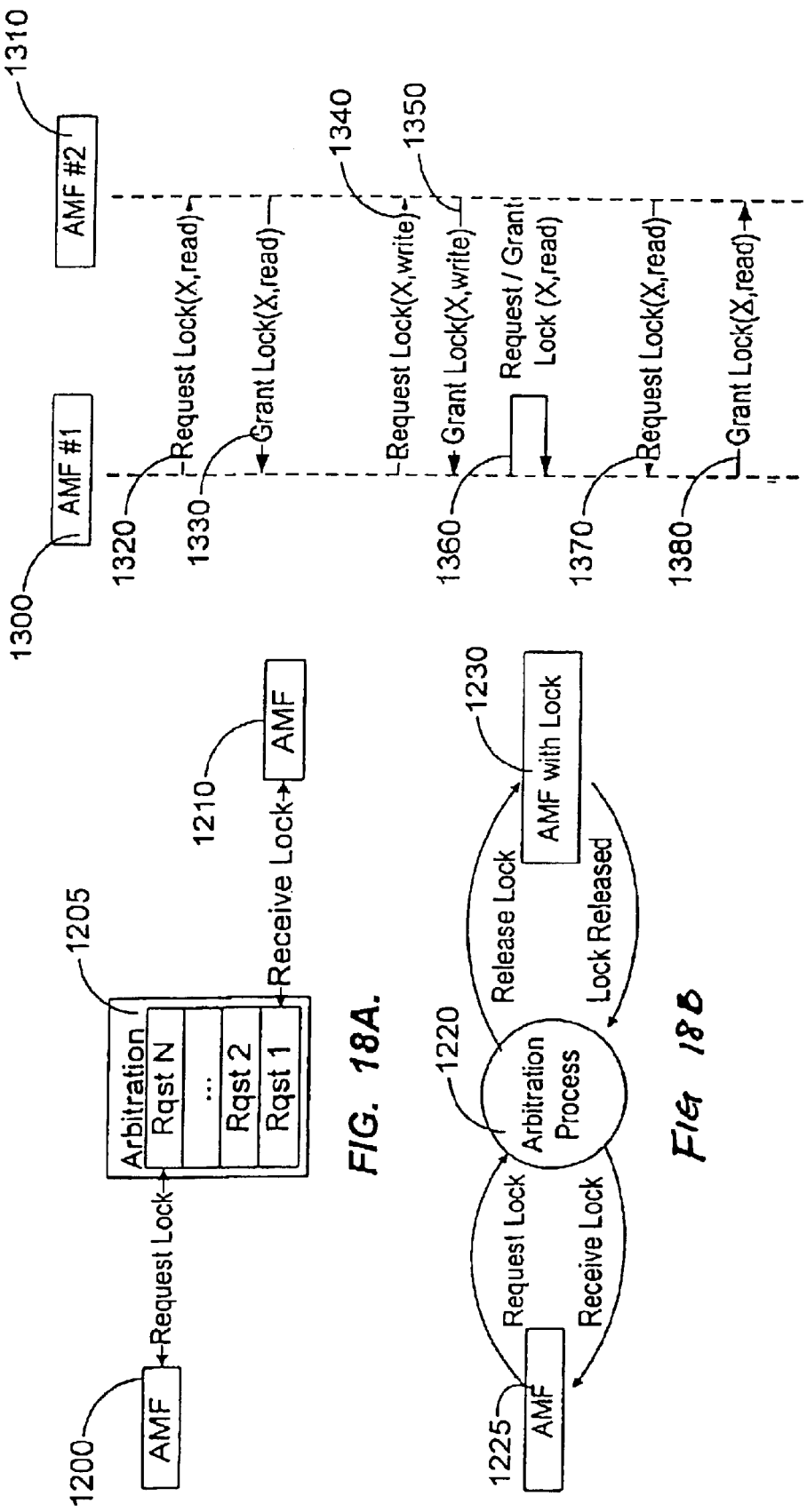

METHODS AND SYSTEMS FOR IMPLEMENTING SHARED DISK ARRAY MANAGEMENT FUNCTIONS

CROSS REFERENCE TO RELATED APPLICATIONS

This application is a continuation of U.S. patent application Ser. No. 09/261,906 filed Mar. 3, 1999, now U.S. Pat. No. 6,148,414 and claims the benefit of U.S. Provisional Patent Application No. 60/101,742 filed Sep. 24, 1998, the disclosures of which are incorporated herein by reference.

BACKGROUND OF THE INVENTION

The present invention relates in general to systems and methods for eliminating bottlenecks in data storage networks, and in direct server attached storage, and more specifically to systems and methods for implementing dynamically shared redundancy group management between multiple disk array management functions.

The need for faster communication among computers and data storage systems requires ever faster and more efficient storage networks. In recent years, implementation of clustering techniques and storage area networks (SANs) have greatly improved storage network performance. In a typical storage network, for example, N servers are clustered together for a proportional performance gain, and a SAN (e.g., a Fiber Channel based SAN) is added between the servers and various RAID ("Redundant Array of Inexpensive Disks") storage systems/arrays. The SAN allows any server to access any storage element. However, in the typical storage network, each RAID system has an associated RAID controller that must be accessed in order to access data stored on that particular RAID system. This can lead to bottlenecks in system performance as the storage managed by a particular RAID controller can only be accessed through that RAID controller. Furthermore, if a controller fails, information maintained in the RAID system managed by the failed controller becomes inaccessible.

One solution for providing fault tolerance is to include a redundant controller in a master/slave arrangement. The master controller has primary control, and only when the master fails does the slave controller take over. This solution is very inefficient, however, as the slave controller is not used until a failure in the master has occurred. Another solution is to use the master/slave controller architecture, but to split the storage array into two redundancy groups, each of which is controlled by one and only one of the two controllers (each controller is a "master" vis-à-vis the redundancy group it controls). In this manner, both controllers are operational at the same time, thereby improving the efficiency of the system. In the event one controller fails, the other controller assumes control of the failed controller's redundancy group. This solution also prevents "collisions", which occur, for example, when more than one controller tries to write data to a redundancy group. However, this solution also has some performance drawbacks. For example, the performance in such a master/slave architecture is bound by the speed of the master controller such that performance is not scalable.

Thus, it is desirable to provide techniques for implementing a peer-to-peer controller architecture solution where system performance is not bound by the speed of a given controller. Further, such a system should provide suitable fault tolerance and performance scalability.

SUMMARY OF THE INVENTION

The present invention provides such a peer-to-peer controller architecture solution for data storage management. The systems and methods of the present invention implement a novel type of RAID Array Management Function that is useful for building highly scalable disk arrays. In particular, the systems and methods of the present invention provide for sharing redundancy group management between multiple (two or more) Array Management Functions.

According to the invention, multiple Array Management Functions (AMFs) are connected to multiple redundancy groups over an interconnect medium. In one embodiment, for example, the Array Management Functions are connected to the redundancy groups over any storage area network (SAN), such as a fiber-channel based SAN. The multiple AMFs share management responsibility of the redundancy groups, each of which typically includes multiple resources spread over multiple disks. The AMFs provide concurrent access to the redundancy groups for associated host systems. When a host requests an AMF to perform an operation on a resource, the AMF synchronizes with the other AMFs sharing control of the redundancy group that includes the resource to be operated on, so as to obtain a lock on the resource. While performing the operation, the AMF send replication data and state information associated with the resource such that if the AMF fails, any of the other AMFs are able to complete the operation and maintain data reliability and coherency.

As used herein, the terms "Array Management Function," "Redundancy Group," and "Redundancy Group Management" are defined as set forth in The RAID Advisory Board's (RAB) Handbook on System Storage Technology, $6^{th}$ edition, the contents of which are herein incorporated by reference for all purposes.

"Array Management Function" (AMF) generally refers to the body that provides common control and management for one or more disk or tape arrays. An AMF presents the arrays of tapes or disks it controls to the operating environment as one or more virtual disks or tapes. An AMF typically executes in a disk controller, an intelligent host bus adapter or in a host computer. When it executes in a disk controller, an AMF is often referred to as firmware. One or more AMFs can execute in each controller, adapter or host as desired for the particular application.

"Redundancy Group" generally refers to a collection of p_extents organized by an AMF for the purpose of providing data protection. With one redundancy group, a single type of data protection is used. All the user data storage capacity in a redundancy group is protected by check data stored within the group, and no user data capacity external to a redundancy group is protected by check data within it. Redundancy groups typically include logical entities composed of many resources such as stripes, data blocks, cached data, map tables, configuration tables, state tables, etc.

"Redundancy Group Management" generally refers to the responsibilities, processes and actions of an AMF associated with a given redundancy group.

According to the invention, updates of the check data within a redundancy group are dynamically coordinated and synchronized between the various AMFs sharing the redundancy group. Such updating is facilitated using coherency and locking/unlocking techniques. Coherency and locking are typically performed as a function of a block, a group of blocks, a stripe or a group of stripes. Locking is performed dynamically using any of a variety of well known or proprietary coherency protocols such as MESI. Additionally, the coherency between the caches associated with a redundancy group and the data contained within the redundancy group is synchronized and maintained.

According to an aspect of the invention, a data storage network is provided which typically comprises a redundancy group including a plurality of resources, and two or more array management functions (AMFs) sharing access to the redundancy group. The AMFs provide concurrent access to the redundancy group for associated host systems. The network also typically includes a storage area network for connecting the AMFs with the redundancy group. In a typical operation, when a first one of the AMFs desires to perform an operation on a first resource in the redundancy group, the first AMF arbitrates with the other AMFs sharing access to the redundancy group for a lock on the first resource. Thereafter, the first AMF performs the operation on the first resource and concurrently sends replication data and state information associated with the first resource to the other AMFs such that if the first AMF fails while performing the operation, one of the other AMFs is able to complete the operation.

According to another aspect of the invention, a method of dynamically sharing management of a redundancy group between two or more array management functions (AMFs) is provided, where the AMFs are able to concurrently access the redundancy group, which includes a plurality of resources. The method typically comprises the steps of receiving a request from a host by a first one of the AMFs to perform a first operation on a first one of the resources, synchronizing with the other AMFs so as to acquire access to the first resource, and performing the first operation on the first resource.

According to yet another aspect of the invention, a data storage network system is provided, which typically comprises one or more redundancy groups, each redundancy group including multiple resources spread over multiple disks, and two or more array management functions (AMFs) sharing redundancy group management of the one or more redundancy groups, wherein the AMFs are able to concurrently access the one or more redundancy groups. The system also typically comprises a storage area network for interconnecting the AMFs with the redundancy groups.

According to a further aspect of the invention, a method of reconstructing a redundancy group when one of its disks fails in a data storage network system is provided. The typical network system comprising two or more array management functions (AMFs) interconnected with the redundancy group over a storage area network, wherein the AMFs all share management of the redundancy group, and wherein the AMFs are able to concurrently access the redundancy group. The redundancy group includes multiple resources spread over multiple disks and a replacement disk. The method typically comprises the steps of arbitrating for control of a first resource of the redundancy group by a first one of the AMFs, arbitrating for control of a second resource of the redundancy group by a second one of the AMFs, and concurrently reconstructing the first and second resources using the replacement disk.

According to yet a further aspect of the invention, a method of expanding a redundancy group when an extra disk is added to it in a data storage network system is provided. The network system typically comprises two or more array management functions (AMFs) interconnected with the redundancy group over a storage area network. The redundancy group includes multiple resources spread over multiple disks. The AMFs all share management of the redundancy group, and are able to concurrently access the redundancy group. The method typically comprises the steps of arbitrating for control of a first resource by a first one of the AMFs, arbitrating for control of a second resource by a second one of the AMFs, and concurrently expanding the first and second resources using the extra disk.

According to an additional aspect of the invention, a method of pipelining replication of incoming host data in a data storage network system is provided. The network system typically comprises a redundancy group interconnected with two or more array management functions (AMFs) over a storage area network. The redundancy group includes multiple resources spread over multiple disks. The AMFs all share management of the redundancy group, and are able to concurrently access the redundancy group. The method typically comprises the steps of receiving a write command by a first AMF from a host to write at least two data sets to two or more of the resources, and acquiring a lock by the first AMF on the first resource to which the first data set is to be written. The method also typically includes the steps of writing the first data set to the first resource, and concurrently performing a first replication operation wherein replication data and state information associated with the first resource is sent to the other AMFs, such that if the first AMF fails while performing the write operation, one of the other AMFs is able to complete the write operation.

According to yet an additional aspect of the invention, a method is provided for dynamically sharing management of a redundancy group between two or more array management functions (AMFs) in a data storage system. The AMFs are able to concurrently access the redundancy group, which includes a plurality of resources. The method typically comprises the step of determining an arbiter AMF for a first one of the resources, wherein the arbiter AMF is one of the two or more AMFs sharing management of the redundancy group. The arbiter AMF is able to grant a lock for the first resource. The method also typically comprises the steps of communicating a lock request from a first one of the AMFs to the arbiter AMF requesting a lock on the first resource, and performing an operation on the first resource by the first AMF once the lock on the first resource has been granted by the arbiter AMF.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 18a illustrates a basic arbitration process where an AMF requests a lock for a particular resource according to the present invention;

FIG. 18b illustrates the general process flow of the generalized arbitration process according to the present invention;

FIG. 19 illustrates a simplified arbitration process between two AMFs in a cluster configuration for a single resource.

DETAILED DESCRIPTION

The present invention provides for shared redundancy group management (SRGM) between multiple AMFs so that multiple AMFs can simultaneously access the same redundancy group. According to the present invention, distributed synchronization and replication techniques are used to coordinate the activities of all AMFs sharing a redundancy group and to maintain data reliability. Access to any redundancy group can be gained through any controller that includes an AMF that is sharing control of that redundancy group. The AMFs sharing a resource group are therefore peers. Additionally, if a redundancy group is configured for shared access and a controller fails, access to data through the failed controller is blocked, but the data on the redundancy group is still intact, protected from disk failures, and accessible from any other controller that includes an AMF which is sharing that redundancy group. Within a given controller, multiple AMFs may be present, in which case redundancy groups are preferably shared on a group by group basis. That is, some redundancy groups may be shared by a first group of AMFs, other redundancy groups may be shared by a second group of AMFs, and still other redundancy groups may not be shared at all. In preferred aspects, within a given controller there is a one-to-one association between an AMF and a redundancy group; that is an AMF manages only one redundancy group at a time. Alternately, an AMF manages multiple AMFs at the same time.

Figure 1:
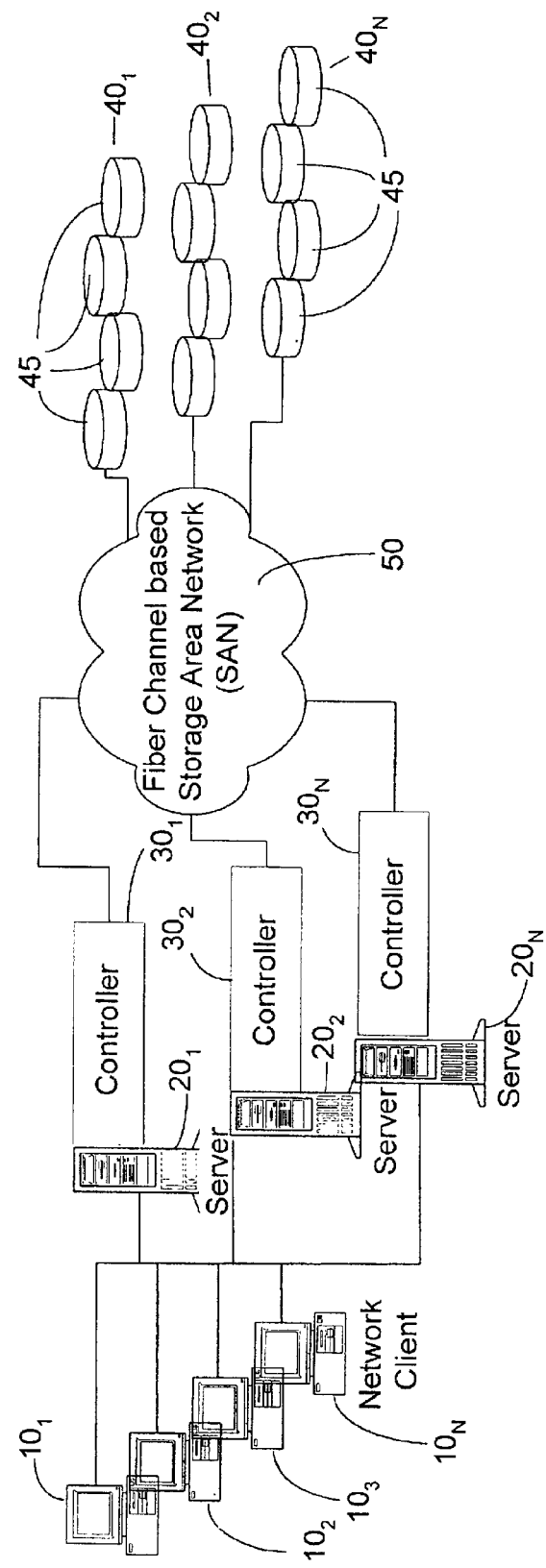
FIGS. 1 to 7 show exemplary configurations useful for providing data from one or more redundancy groups to one or more host systems using controllers sharing access to and control of redundancy groups according to the present invention.

FIG. 1 shows a basic network configuration according to the present invention. As shown, a plurality of network clients $10_1$ to $10_N$ are communicably coupled with a plurality of servers $20_1$ to $20_N$, each of which includes a controller 30. (In general, "N" is used herein to indicate an indefinite plurality, so that the number "N" when referred to one component does not necessarily equal the number "N" of a different component. For example, the number of clients 10 does not, but may, equal the number of servers 20 in FIG. 1.) Each network client 10 is coupled to one or more of servers 20 over any of a number of connection schemes as required for the specific application and geographical location relative to servers 20, including, for example, an internet connection, any local area network (LAN) type connection, any wide area network (WAN) type connection, any proprietary network connection, etc. Each controller 30 includes one or more AMFs, and is communicably coupled with the multiple arrays 40 of disk drives 45 over an interconnect medium, such as a storage area network (SAN) 50. Preferably, SAN 50 is a fiber-channel based SAN. However, any SAN type, such as a SCSI-based SAN, or any direct server interconnect such as a direct SCSI or FC connection may be used without departing from the spirit of the invention. Because each controller 30 has direct access to each array 40 over SAN 50, redundancy group management can be shared by all of controllers 30.

A fiber-channel based SAN is preferred because the fiber-channel standard is an open standard that supports several network topologies including point-to-point, switched fabric, arbitrated loop, and any combination of these topologies. Further, a number of protocols are supported by the fiber-channel standard, including SCSI, Asynchronous Transfer Mode (ATM), Transmission Control Protocol/Internet Protocol (TCP/IP), High Performance Parallel Interface (HiPPI), Intelligent Peripheral Interface (IPI), and others. Moreover, Fiber-channel presently provides for data transfer speeds of up to 100 MBps (200 MBps duplex) at distances of up to 30 meters over copper cabling and up to 10 kilometers over fiber-optic cabling.

Figure 2:
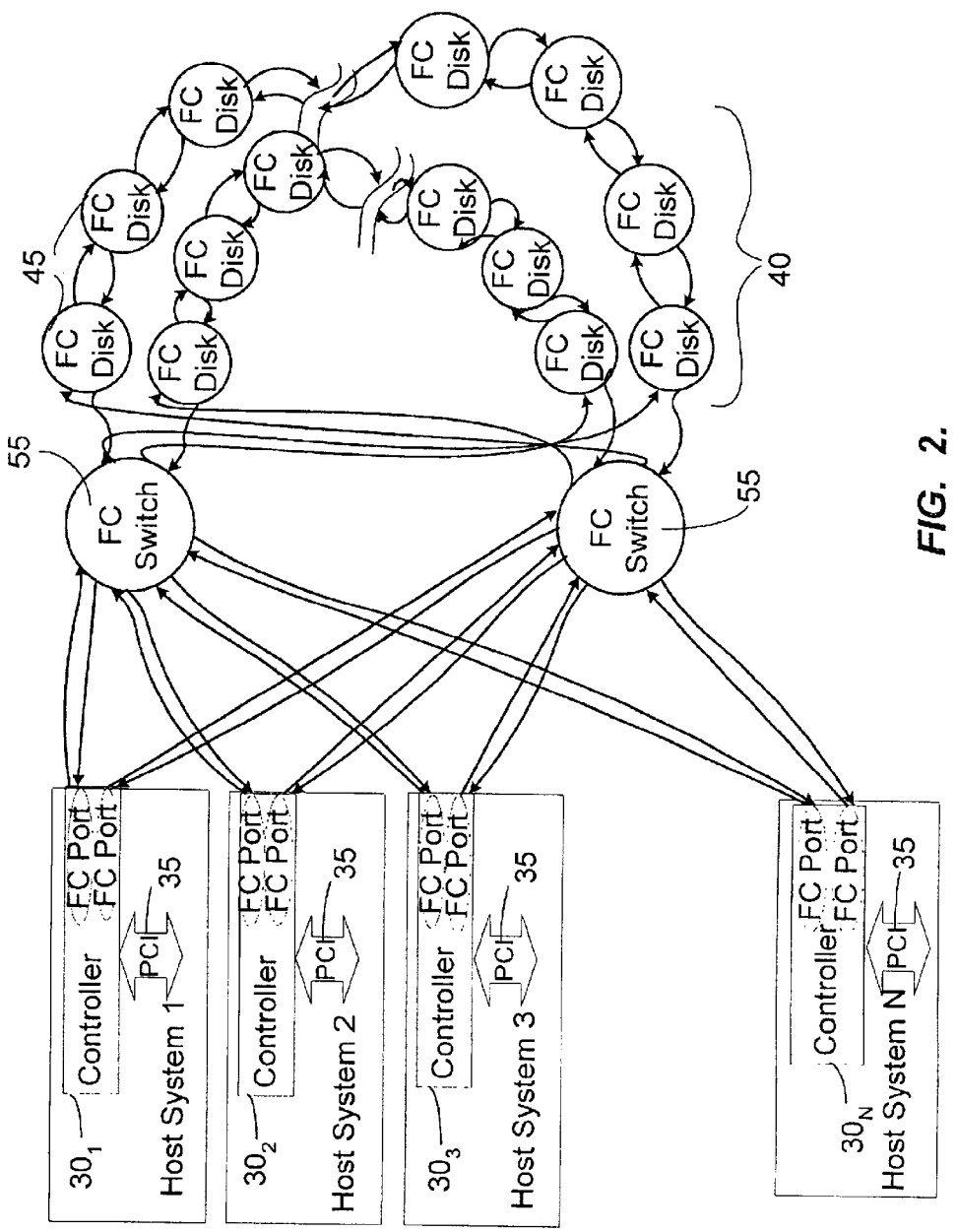

FIG. 2 shows an example of multiple hosts, each with a controller configured in a switch-based fiber-channel SAN according to the present invention. Each controller 30 is coupled to switches 55 in the SAN through two fiber-channel ports as shown. Thus, each controller 30 is in communication with all other controllers 30 and with disk array 40. Each controller 30 communicates with its host system over a PCI bus 35. Switches 55 are coupled to disk array 40 using the loop topology as shown. However, it will be apparent to one of skill in the art that many loops can be supported through any of a number of switching topologies. In general, the more loops, the greater the data transfer rates that can be supported. The system redundancy as shown in FIG. 2 is N−1, meaning that given N controllers ($30_1$ to $30_N$) up to N−1 controllers can fail and no data on disk array 40 will be lost when all controllers 30 are configured to share management of array 40. A controller failure for a specific host causes a loss of data availability for the specific host, but not for the entire system. Controller environmental faults, such as power supply failures are protected against in this system configuration because the data from one host system is synchronized to data on the other host systems according to the present invention as will be described in more detail below.

There is a recovery period associated with a controller failure. This is the time it takes for the surviving controllers to make sure that all critical data is again replicated within the cluster. If another controller fails during this recovery period, then data may be lost.

Figure 3:
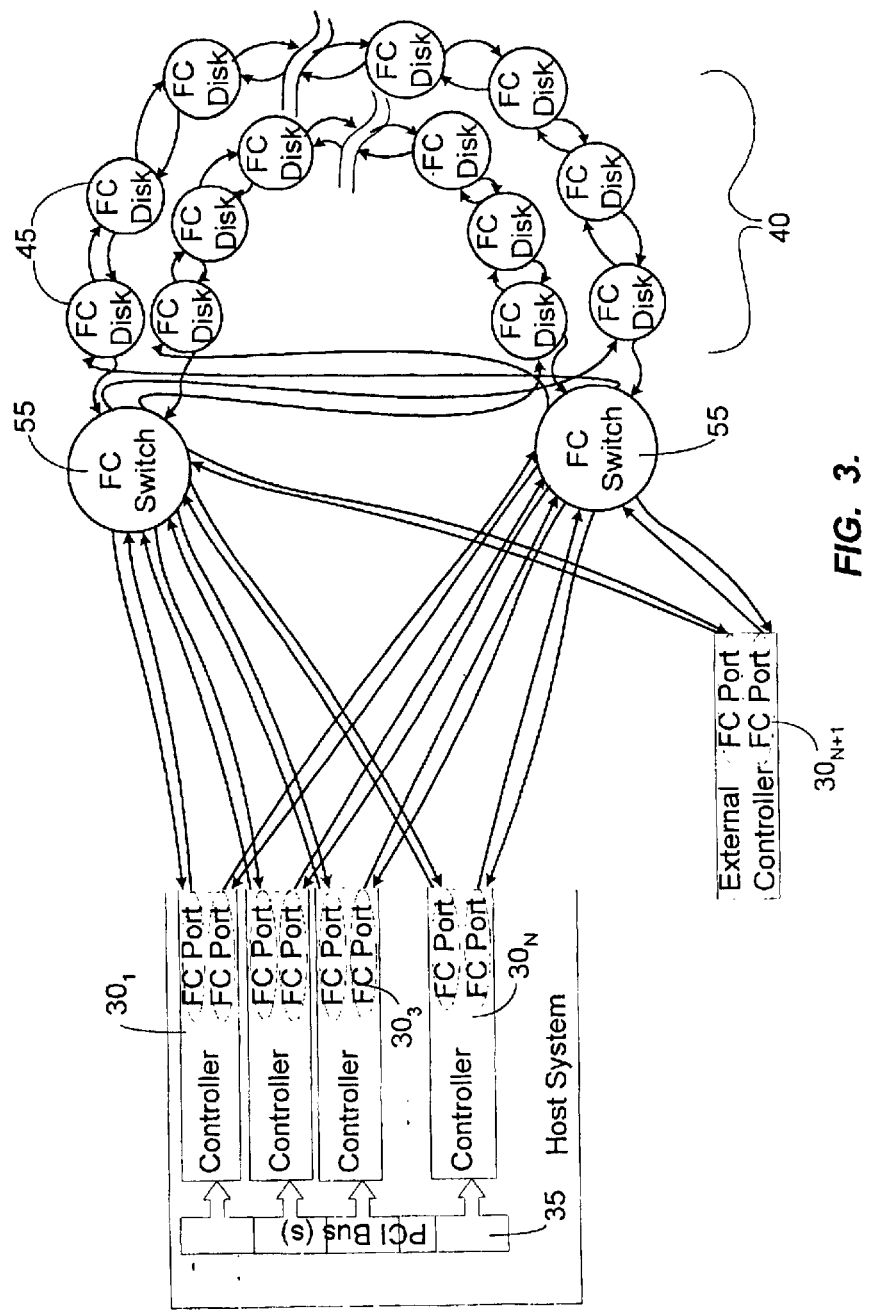

FIG. 3 shows an example of multiple controllers and a single host configured in a switch-based fiber-channel SAN according to the present invention. Each controller 30 is coupled to the switches 55 in the SAN through two fiber-channel ports as shown, however, from 1 to N ports may be used as desired for the particular application. Thus, each controller 30 is in communication with all other controllers 30 and with disk array 40 over the fiber-channel SAN. Further, each controller 30 communicates with the host system over one or more PCI buses 35. The controllers 30 are also able to communicate with each over the PCI buses 35. Switches 55 are coupled to disk array 40 using the loop topology as shown. However, it will be apparent to one of skill in the art that many loops can be supported through any of a number of switching topologies. In general, the more loops, the greater the data transfer rates that can be supported. In this configuration, up to N−1 controllers can fail before loss of data availability to the host system. External controller $30_{N+1}$ is provided to protect against a failure of the host system. If the host system fails, no data will be lost on array 40 when controller $30_{N+1}$ is configured to share management of array 40 with the controllers $30_1$ to $30_N$ of the host system according to the present invention.

Figure 4:
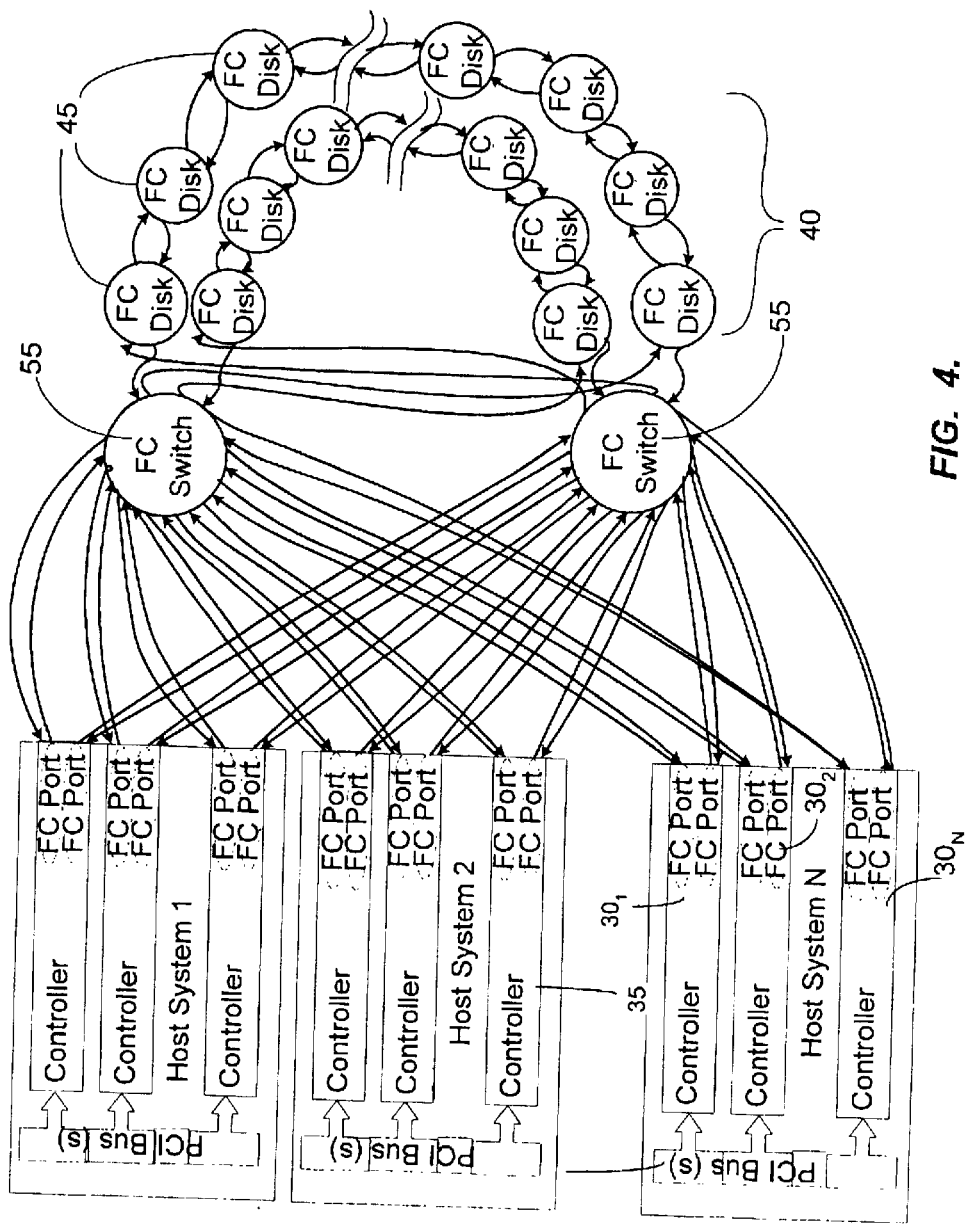

FIG. 4 shows an example of multiple hosts each with multiple controllers configured in a switch-based fiber-channel SAN according to the present invention. Each controller 30 is coupled to the switches 55 in the SAN through two fiber-channel ports as shown, however, from 1 to N ports may be used as desired for the particular application. Thus, each controller 30 is in communication with all other controllers 30 and with disk array 40 over the fiber-channel SAN. Further, each controller 30 communicates with its host system over one or more PCI buses 35. The controllers 30 are also able to communicate with each over the PCI buses 35. Switches 55 are coupled to disk array 40 using the loop topology as shown. However, it will be apparent to one of skill in the art that many loops can be supported through any of a number of switching topologies. In general, the more loops, the greater the data transfer rates that can be supported. In this configuration, redundancy and synchronization exist between two or more controllers 30 within each host system. Where each host system includes N controllers 30, up to N−1 controllers can fail before loss of data availability to the host system. If a host system fails, no data will be lost on array 40 when controllers 30 on other hosts are configured to share management of array 40 with the controllers 30 of the failed host system according to the present invention.

Figure 5:
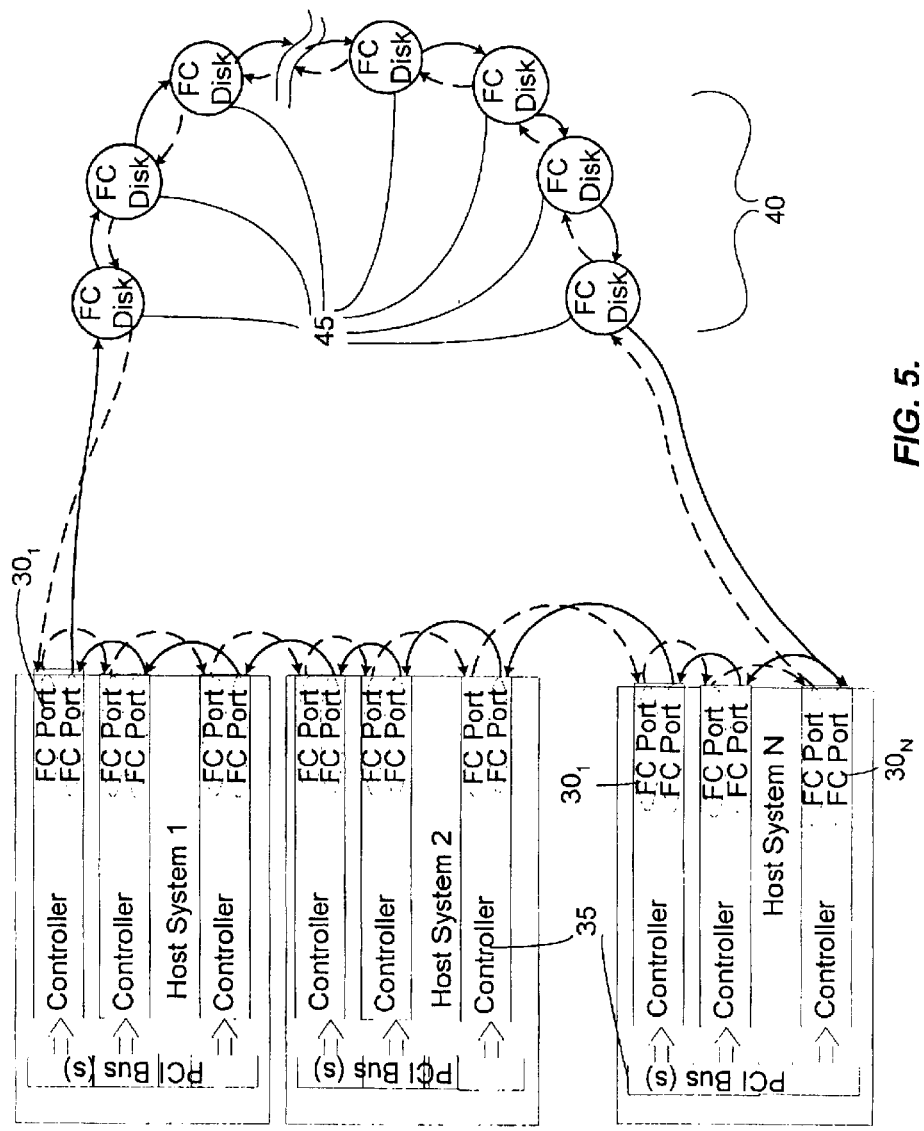

FIG. 5 shows an example of multiple hosts each with multiple controllers configured in a fiber-channel arbitrated loop (FC-AL) SAN according to the present invention. Each controller 30 is coupled to the loop through the two fiber-channel ports as shown. Thus, each controller 30 is in communication with all other controllers 30 and with disk array 40 over the FC-AL. Further, each controller 30 communicates with its host system over one or more PCI buses 35. In this configuration, redundancy and synchronization exist between two or more controllers within each host system. Where each host system includes N controllers 30, up to N−1 controllers can fail before loss of data availability to the host system. Further, if a host system fails, no data will be lost on array 40 when controllers 30 on other hosts are configured to share management of array 40 with the controllers 30 of the failed host system according to the present invention.

Figure 6:
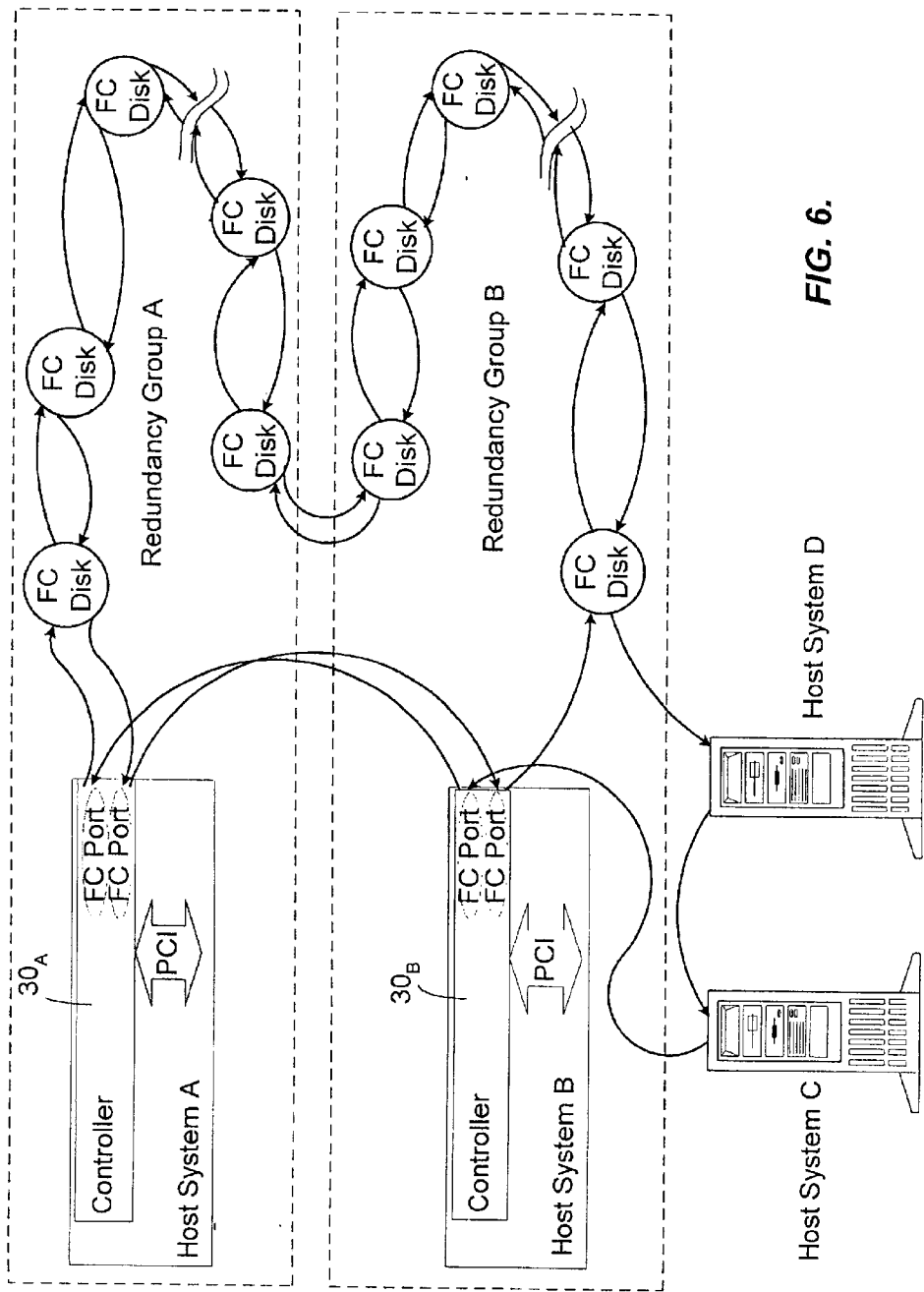

FIG. 6 shows two independent redundancy groups managed by two independent controllers according to the present invention. Redundancy group A is managed by controller $30_A$ of host system A, and redundancy group B is managed by controller $30_B$ of host system B. Also shown are external host system C and external host system D. According to one embodiment, the FC ports of controllers $30_A$ and $30_B$ function as both device and host channels. This allows each controller $30_A$ or $30_B$ to respond to service requests from its associated PCI bus 35 or from an external FC host such as external host system C, external host system D or another controller such as controller $30_B$ or $30_A$, respectively. In this manner, redundancy group A is made accessible to host system B and redundancy group B is made accessible to host system A. From the perspective of controller $30_A$, for example, a request received from host system B to read or write data is treated as if it were received over associated PCI bus 35. Similarly, external hosts systems C and D are able to access data on redundancy groups A and B by issuing read or write commands to the appropriate controller 30 over the fiber-channel SAN. Any number of host systems can be interconnected in this manner. Further, although only a single controller configuration is shown, other configurations can be used, such as the configuration as illustrated in FIG. 4. The use of switches helps isolate the disk arrays for performance scalability.

Figure 7:
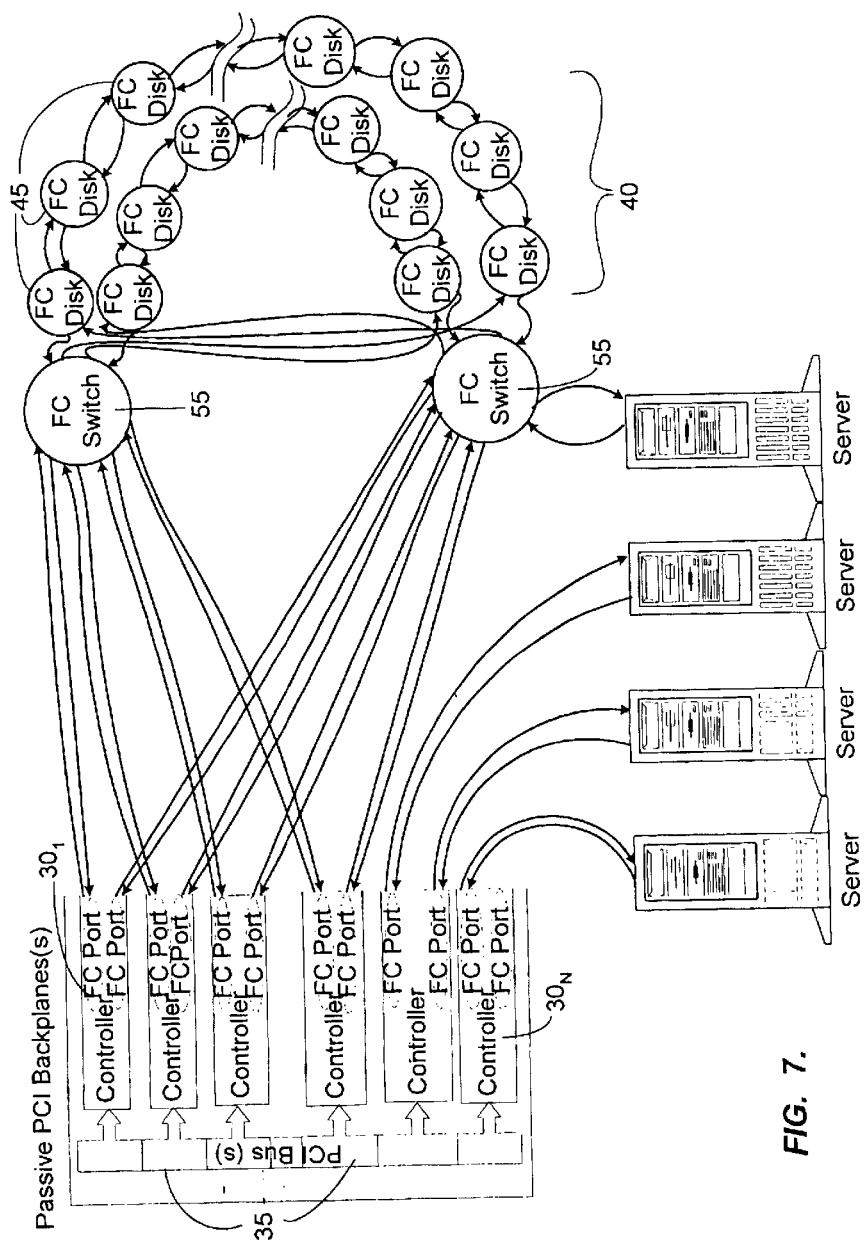

FIG. 7 shows an example of an external RAID system including multiple controllers in passive PCI Backplane(s) configured in a switch-based fiber-channel SAN according to the present invention. The controllers $30_1$ to $30_N$ are installed into one or more passive PCI backplanes, and are configured to accept host commands from the FC ports and/or the associated PCI buses. Thus, external servers are able to access data on the various redundancy groups controlled by the controllers $30_1$ to $30_N$ by issuing read or write requests to the appropriate controller 30. Although only one controller 30 is required, performance and redundancy scales as more controllers are added. A FC-AL similar to the configuration shown in FIG. 5 can alternatively be used if the use of switches 55 is undesired or impractical.

Figure 8:
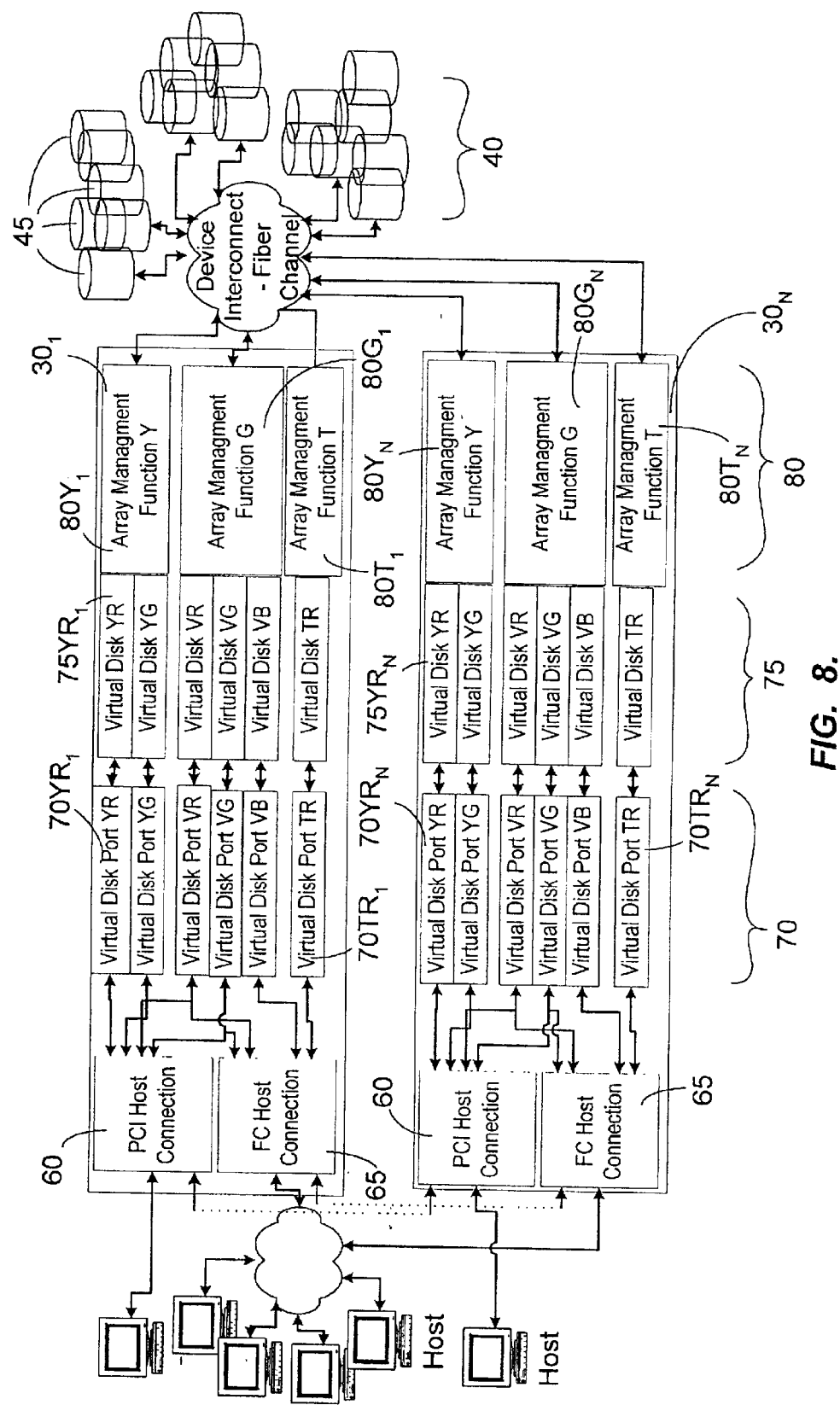
FIG. 8 shows a multiple controller configuration and the internal configuration of the controllers according to the present invention.

FIG. 8 shows a multiple controller configuration and the internal configuration of controllers 30 according to the present invention. One or more of the controllers $30_1$ to $30_N$ shown in FIG. 8 may be located in a separate host or on passive PCI backplanes. For example, each controller 30 may be located in a separate host system, or each of multiple host systems may include one or more of the controllers 30. PCI host connection 60 provides a connection path for receiving and processing commands from host systems and for providing inter-controller link (ICL) services with other controllers. Fiber-channel (FC) host connection 65 provides a connection means for processing and receiving commands from host systems and for providing ICL services with other controllers. In preferred aspects, each controller includes two physical PC ports (not shown in FIG. 8, but see FIGS. 2 through 7 for examples), both of which are used for disk drive access, receiving and processing host commands and ICL services. It will be apparent to one skilled in the art that each controller can include from 1 to N FC ports as desired for the particular application.

Each controller 30 includes one or more virtual disk ports 70 each of which provides access to a virtual disk 75. Virtual disks 75 are basically partitions of an array. (A "Redundancy Group" is generally synonymous with "Array"). Each array may be partitioned into as many virtual disks 75 as desired. Each virtual disk is associated and controlled by one or more associated AMFs 80. Many virtual disk ports 70 can exist for the same virtual disk 75, but each must exist on a separate controller. For example, as shown in FIG. 8, virtual disk ports $70YR_1$ and $70YR_N$ associated with virtual disk YR are provided to hosts on controller $30_1$ and controller $30_N$, respectively. Each virtual disk port YR provides access to the same virtual disk YR. Virtual disk YR is a partition of array Y, the control and management of which is shared by AMFs $80Y_1$ and $80Y_N$.

Virtual disk ports can be added to a controller at any time by creating a virtual disk and assigning an IO port address to the virtual disk port. Generally, a virtual disk must exist before a virtual disk port is created and assigned to it, but the creation of a virtual disk is not coincident with the creation of a virtual disk port. Typically a virtual disk port is created right after the redundancy group is created. Virtual disk ports can then be created at any time thereafter, but the creation of the virtual disk is only done once. Virtual disk ports can also be deleted at any time. All host operations in progress on the port are allowed to complete. While these operations are completing, new host operations are rejected, for example, by returning a not_ready status signal to the host.

Given that multiple AMFs 80 are present on each controller 30, redundancy groups are shared on a group-by-group basis. As shown in FIG. 8, there are three groups of AMFs, Y, G and T, each sharing an array. Associated AMFs on different controllers synchronize and replicate with each other as will be described in more detail below. For example, as shown in FIG. 8, AMF $80Y_1$ synchronizes and replicates with AMF $80Y_N$ (and with any other AMF associated with array Y, e.g., AMF $80Y_2$ (not shown)). Similarly, AMF $80G_1$ synchronizes and replicates with AMF $80G_N$, and AMF $80T_1$ synchronizes and replicates with AMF $80T_N$. Additionally, virtual disk ports on one controller synchronize and replicate with related virtual disk ports on other controllers.

Distributed Synchronization and Replication

Synchronization and replication ensures that the operations performed by the different AMFs sharing a redundancy group (array) do not destructively interfere with each other (e.g., "collisions" do not occur). Synchronization requires that any AMF which needs to access a resource associated with a shared redundancy group arbitrate with the other AMFs for access rights (lock) on the resource before using it. Arbitration is accomplished by sending arbitration messages between the AMFs over the PCI and/or FC ICL links.

Figure 9:
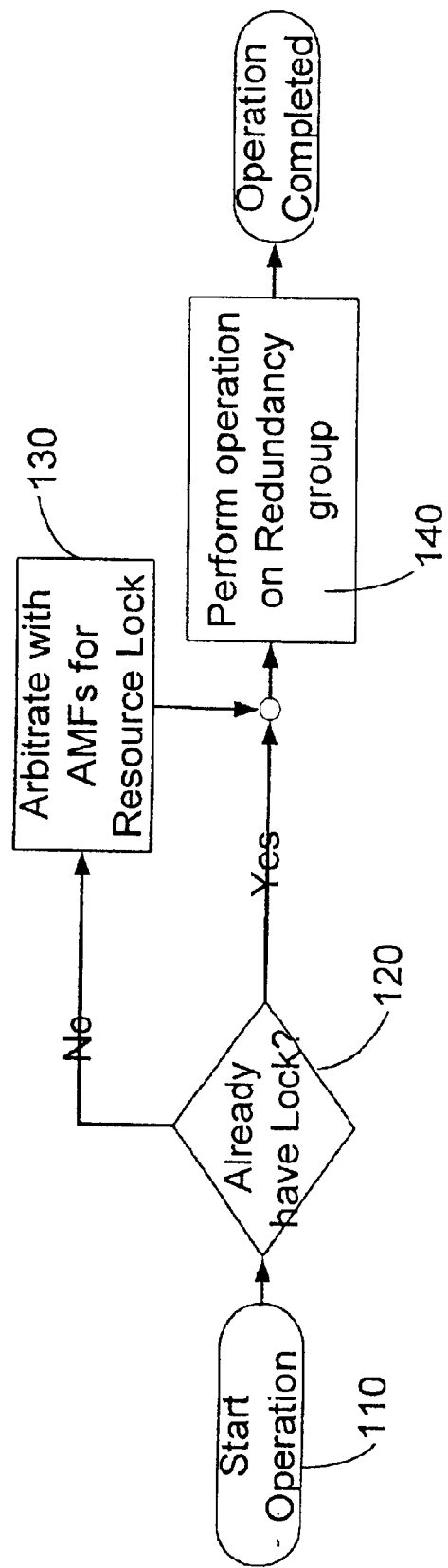
FIG. 9 shows an operation using a general synchronization sequence according to an embodiment of the present invention.

FIG. 9 shows a general synchronization sequence for an operation according to an embodiment of the present invention. In step 110, the operation is started. For example, a host may send a request that requires data be written to a particular resource. At step 120, the AMF determines whether it already has a lock on the desired resource. If not, the AMP arbitrates with other AMFs for a lock on the desired resource in step 130. Once a lock has been acquired (or it is determined that the AMF already has the lock), the desired operation is performed on the resource by the AMF in step 140. Once a lock is acquired by an AMF, it is preferably not released until another AMF needs the lock (i.e., another AMF arbitrates for the lock) to help cut shared redundancy group management (SRGM) overhead in many applications. According to one embodiment, a first-come-first-served type arbitration scheme is used, but a priority based, or any other arbitration scheme can be used. As will be described in more detail below with reference to FIGS. 18, 19 and 20, arbitration typically involves making a request to use a resource to a resource controller (typically software, but sometimes hardware based). The resource controller grants access to the resource based on the arbitration algorithm used. If a resource is in use when the request is made, the requester waits until the resource is free and all other requesters ahead of it have been serviced.

Each AMF is able to execute many types of operations on a redundancy group, including, for example, host reads, host writes, background writes, regeneration's, reconstruction's, online expansion, parity scrubbing, etc. An extended sequence of such operations is a termed a "process". Examples of processes include reconstructions, online expansion, and parity scrubbing. All AMF operation types require synchronization arbitration in order to proceed. Once an operation on a resource is completed by a given AMF, other AMFs are able to use the resource.

Synchronization is preferably performed at the operation level as opposed to the process level. That is, for each operation to be executed, the basic synchronization sequence shown in FIG. 9 is performed. For a process wherein some function must be performed on the entire redundancy group (such as a reconstruction), the processing is broken up into a sequence of operations. Where each operation operates on a different resource, arbitration for synchronization of those resources required for one operation is done independently of the resources required for other operations in the process. Using synchronization at the operation level instead of the process level allows AMFs to share resources while a process is in progress. If synchronization were performed at the process level instead of the operation level, some AMFs would have to wait until the entire process is complete before they could use the resources, thereby resulting in host timeouts.

Replication accommodates AMF failures. Resources and their state information are replicated so that if an AMF fails the resource and its state information is available via another AMF that has a copy of the resource and its state information. During the update (writing) of a certain resource, a copy of the modified resource and/or the resource's operation state is sent to other AMFs sharing the resource. These other AMFs are called replication partners. For example, referring to FIG. 8, AMF $80Y_1$ and AMF $80Y_N$ are replication partners as each share control of Array Y. The replicated information is used by the replication partners to complete the operation in the event that the AMF updating the resource fails during the operation.

Figure 10:
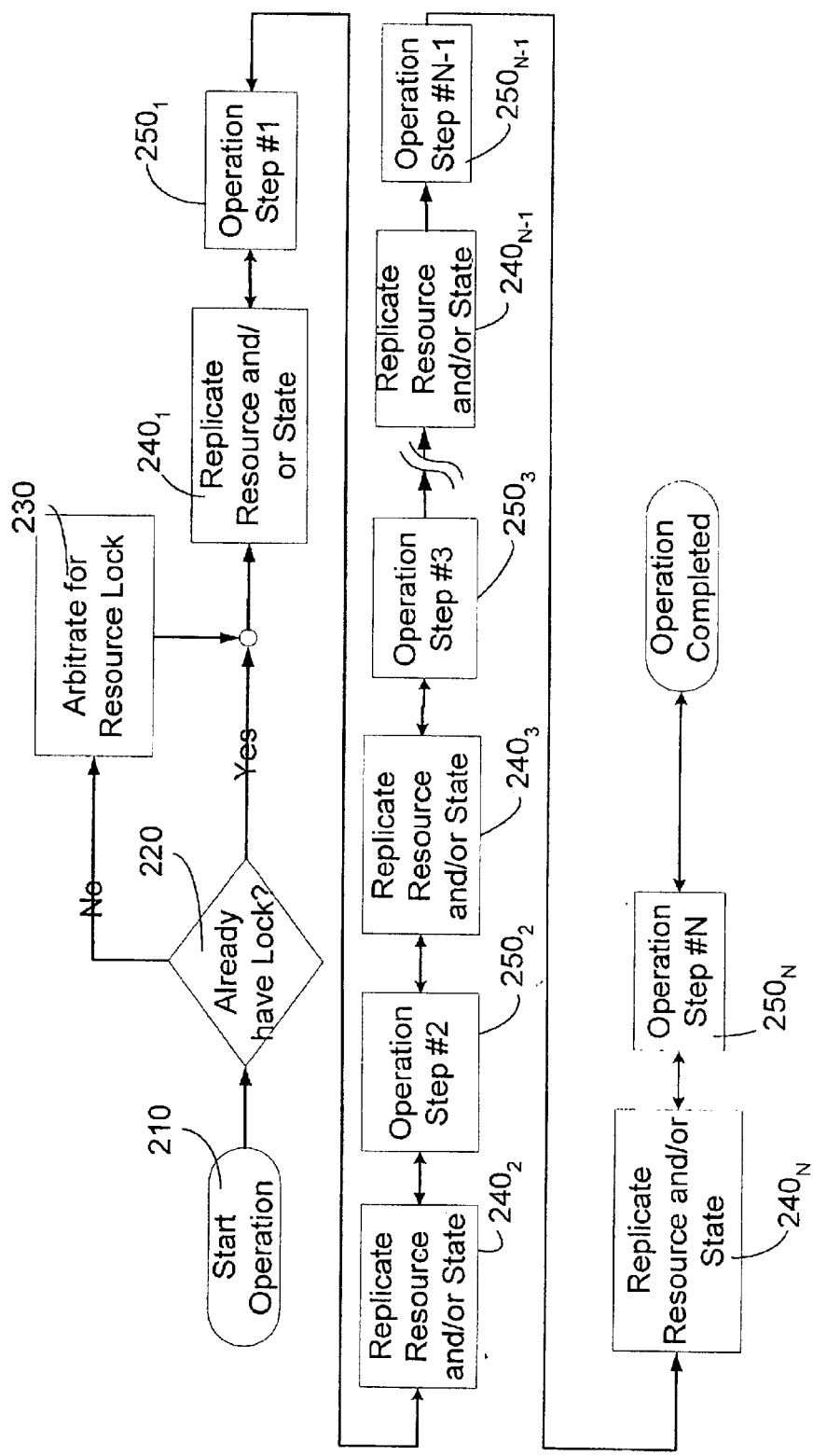
FIG. 10 shows an operation using a general replication sequence according to an embodiment of the present invention.

FIG. 10 shows a general replication sequence for an operation according to an embodiment of the present invention. The start of the sequence is the basic synchronization sequence as shown in FIG. 9. In step 210, the operation is started. For example, a host may send a request that requires writing data to a particular resource. In step 220, the AMF determines whether it already has a lock on the desired resource. If not, the AMF arbitrates with other AMFs for a lock on the desired resource in step 320. Once a lock has been acquired the operation can be performed. As shown, the operation performed by the AMF is broken into a number, i, of steps. In step $240_1$, the replication data and state information associated with the resource and the first operation step is sent to each replication partner. In step $150_1$, the first step of the operation is performed. As shown in FIG. 10, subsequent operation steps $250_2$ to $250_i$ are performed in sequence, as are the replication steps $240_2$ to $240_i$. In each of replication steps $240_1$ to $240_i$, the replication information is sent to the replication partners associated with the given resource. In general, N−1 concurrent AMF failures are accommodated if N copies of a resource and its state information exist within the AMF cluster (i.e., those AMFs sharing the resource), where N is defined as the replication dimension. Thus, replication information is sent to the N−1 replication partners associated with the given resource.

Replication can be targeted to specific replication groups or specific AMFs. In one embodiment, N-way replication is performed without defined replication groups. In this embodiment, replication takes place with any N−1 AMFs in the cluster that are sharing the resource being replicated. Alternately, replication is performed with N−1 other replication groups. A replication group is a group of AMFs that replicate critical data to AMFs in replication groups other than their own. An example of this is a set of controllers, each controller including one or more AMFs, at one physical site and another set of controllers at another physical site. Another example is a set of controllers inside a host system and another set external to a host. Using replication groups helps ensure that if one group of controllers all fail, the other group(s) have the information necessary to maintain data reliability.

The replication can be targeted to specific replication groups or specific AMFs. A given replication group preferably replicates with any AMF outside of the replicating AMFs replication group. However, the set of replication groups to which a given replication group replicates may be specified by an operator. Also, synchronous replication is the preferred replication mode. In the synchronous replication mode, completion status information for an operation is returned to a host after all replication targets have received the replication data. Alternate replication modes include asynchronous replication and pseudo-synchronous replication. In the asynchronous replication mode, completion status information for an operation is returned to a host before replication data has been transmitted. In the pseudo-synchronous replication mode, completion status information for an operation is returned to a host after the replication data has been transmitted, but before all replication targets have acknowledged receiving the data.

According to the present invention, multiple AMFs are able to read a resource concurrently. That is, multiple read locks can be outstanding at any time. However, only one AMF at a time writing to the resource is accommodated. Allowing multiple AMFs to read a resource at the same time significantly improves read performance. If an AMF is writing to the resource, no other AMF is permitted to read the resource. The synchronization protocol allows and enforces this aspect.

Figure 11A:
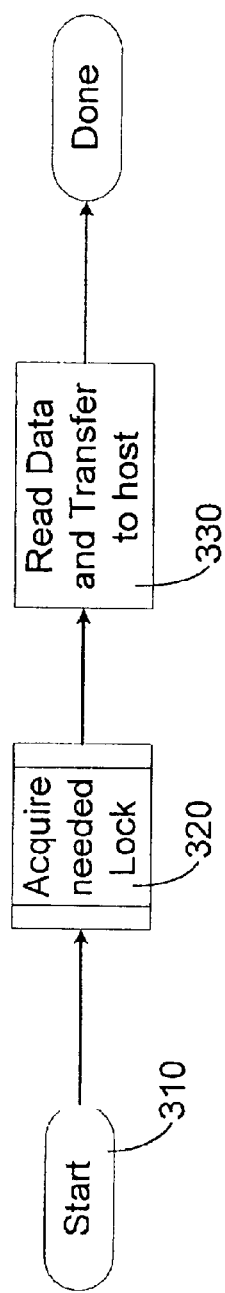
FIG. 11a shows the flow for read operations when the redundancy group is in a normal, non-degraded mode, according to an embodiment of the present invention.

FIG. 11a shows the general sequence flow for a read operation when the redundancy group (RG) is in a normal, non-degraded mode according to an embodiment of the present invention. "Non-degraded" generally refers to the case where all drives in the redundancy group are operational, whereas "degraded" generally refers to the case where one or more drives in the redundancy group have failed. In step 310, the read operation is started. For example, the AMF receives a request from a host to read a particular resource. In step 320, a lock on the particular resource is required. This is basically the same as steps 120 and 130 of FIG. 9. In preferred aspects, multiple locks can be outstanding. This enables multiple AMFs to read a resource concurrently.

Figure 11B:
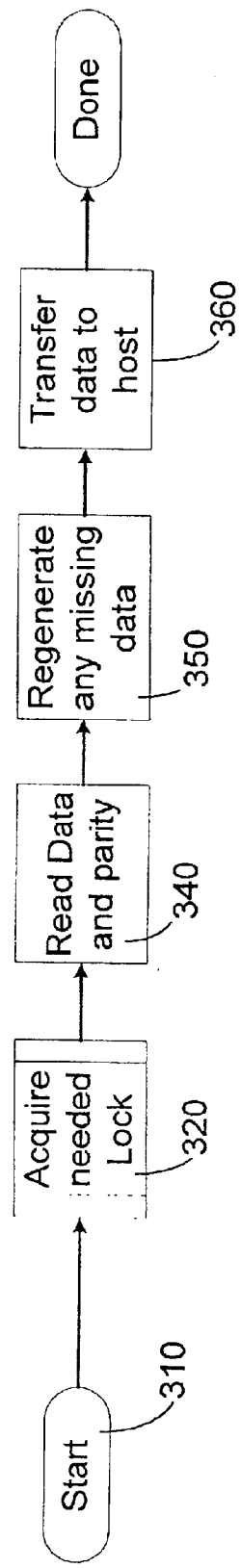
FIG. 11b shows the flow for read operations when the redundancy group is in a degraded mode, according to an embodiment of the present invention.

FIG. 11b shows the general sequence flow for a read operation when the redundancy group (RG) is in a degraded mode according to an embodiment of the present invention. In step 310, the read operation is started. For example, the AMF receives a request from a host to read a particular resource. In step 320, a lock on the particular resource is required. Once the lock is acquired, in the degraded read mode, the AMF reads the data and parity from the particular resource at step 340, and regenerates any missing data at step 350. In step 360, the data (regenerated) is transferred to the host that issued the read request.

Figure 12:
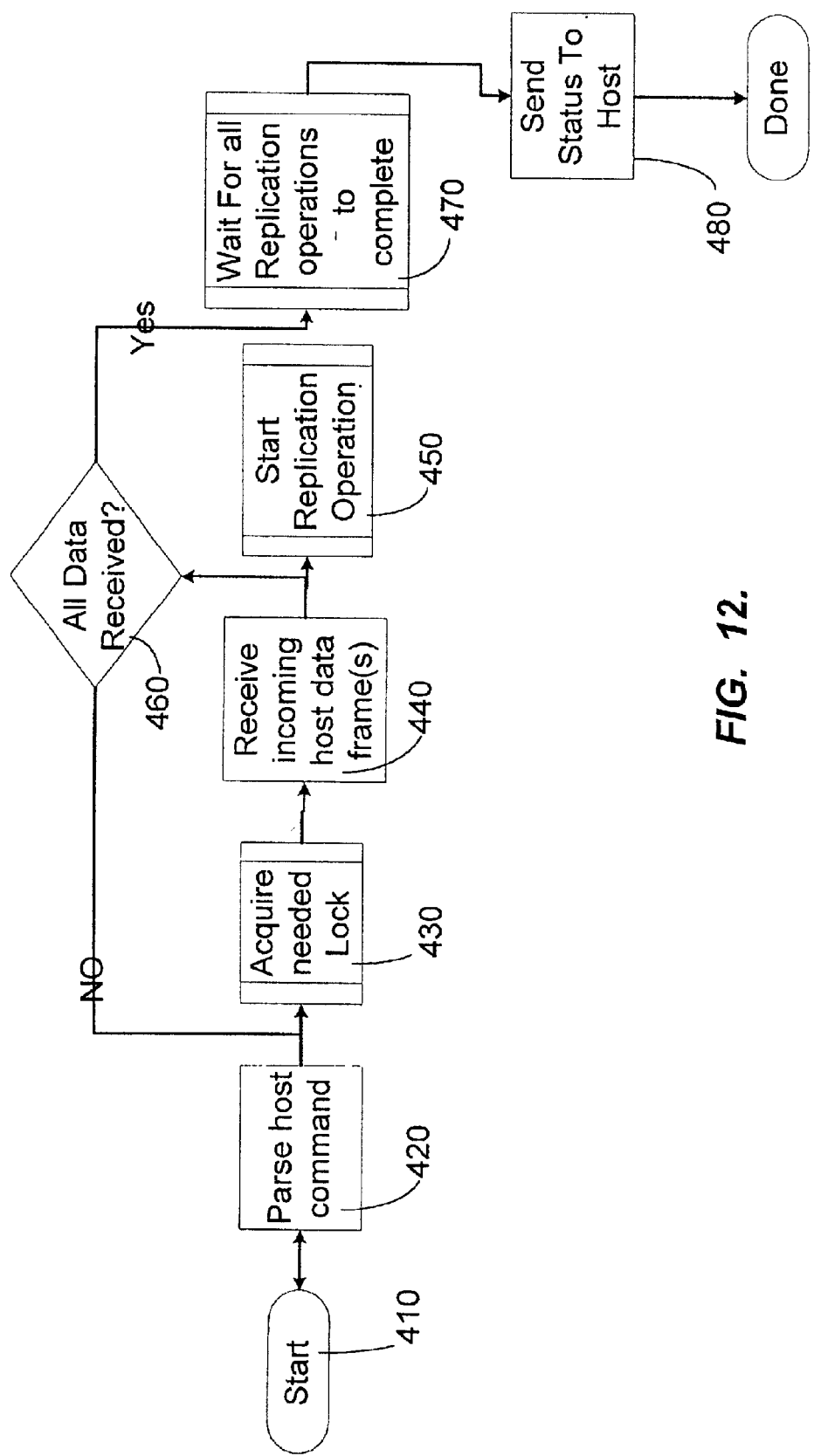
FIG. 12 shows the flow for pipelining the replication of incoming host data according to an embodiment of the present invention.

FIG. 12 shows the general sequence flow for replicating incoming host data in a pipelined manner for a write operation according to an embodiment of the present invention. Pipelining of the replication data helps to minimize replication latency. In step 410, the operation is started. For example, a host issues a write command to write one or more blocks of data to one or more resources. In step 420, the host command is received from the host and parsed. The host command is processed as a sequence of data block sets. In step 430, the appropriate lock for the starting set of blocks is acquired. In step 440, the starting block set is transferred to the AMF from the host. In step 450, the block set replication is started for the starting set of blocks. The AMF does not wait for the block set replication to complete; the AMF immediately determines whether any more sets of blocks need to be processed at step 460. If so, the AMF immediately starts acquiring the appropriate lock to get the next set of blocks in step 430, and repeats steps 440, 450 and 460 for the next block set. If all block sets have been received and processed, the AMF waits for all replication operations to complete in step 470. When each operation is complete the AMF sends status to the host in step 480.

Figure 13A:
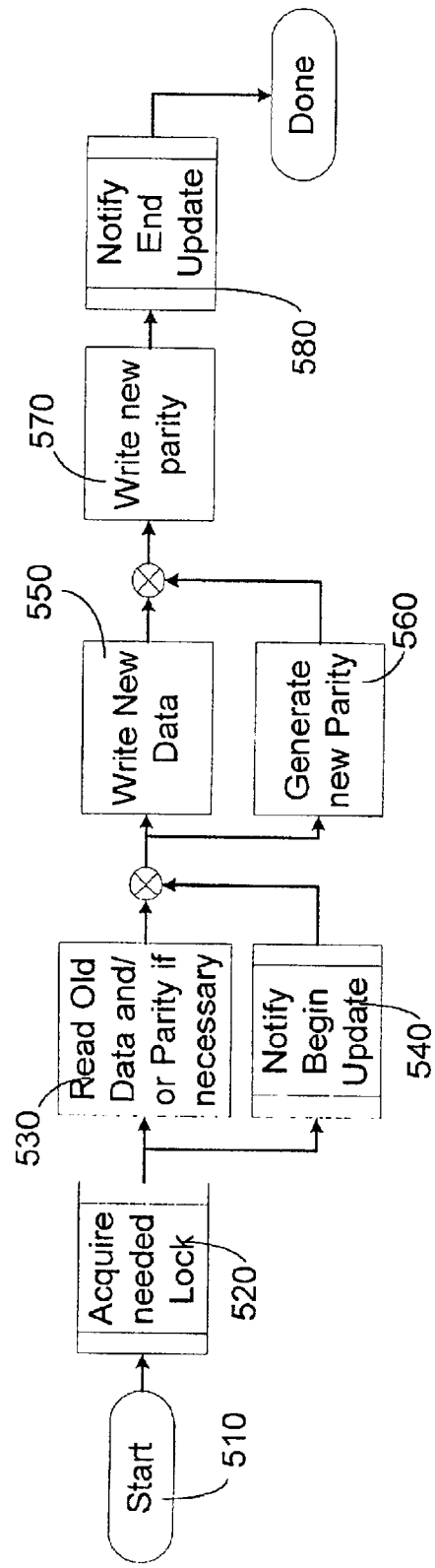
FIG. 13a shows the flow for a write operation when the redundancy group is in a normal, non-degraded mode according to an embodiment of the present invention.

FIG. 13a shows the general sequence flow for a write operation when the redundancy group (RG) is in a normal, non-degraded mode according to an embodiment of the present invention. In step 510, the operation is started. For example, a host issues a write command to write data to a resource. Step 520 is the process of acquiring the synchronization lock for the resource required as shown in FIG. 9. In this example the resource is a stripe write lock, but it may also be any other lock as required by the particular operation. After the stripe write lock is acquired, the AMF reads the old data and parity from the RG's disks in step 530.

Concurrent with the disk read operation of step 530, the AMF sends a state notification signal to its replication partners for this resource, in step 540. The replication partners include all other AMFs to which this AMF replicates state information and data for the particular resource. The number of replication partners is equal to N−1 where N is the replication dimension. Preferably, the replication dimension N is from 1 to 8, but N may be any number as desired. The state notification signal is a 'begin update' type signal, which tells the replication partners that a stripe update has started. The replication partners need to know this information because they will be responsible for cleaning up in the event the writing AMF fails before completing the operation.

Once the 'begin update' notification step 530 and the read of old data and parity step 540 are complete, the AMF writes the new data to the RG member disks in step 550. Concurrent with the new data write step 550 is the generation of the new parity in step 560. Thereafter, in step 570 the AMF writes the new parity to the RG member disks. Once the parity write operation is complete, the AMF sends an 'end update' notification to its replication partners in step 580. Upon receiving this notification, the replication partners release their state data associated with the stripe update.

Figure 13B:
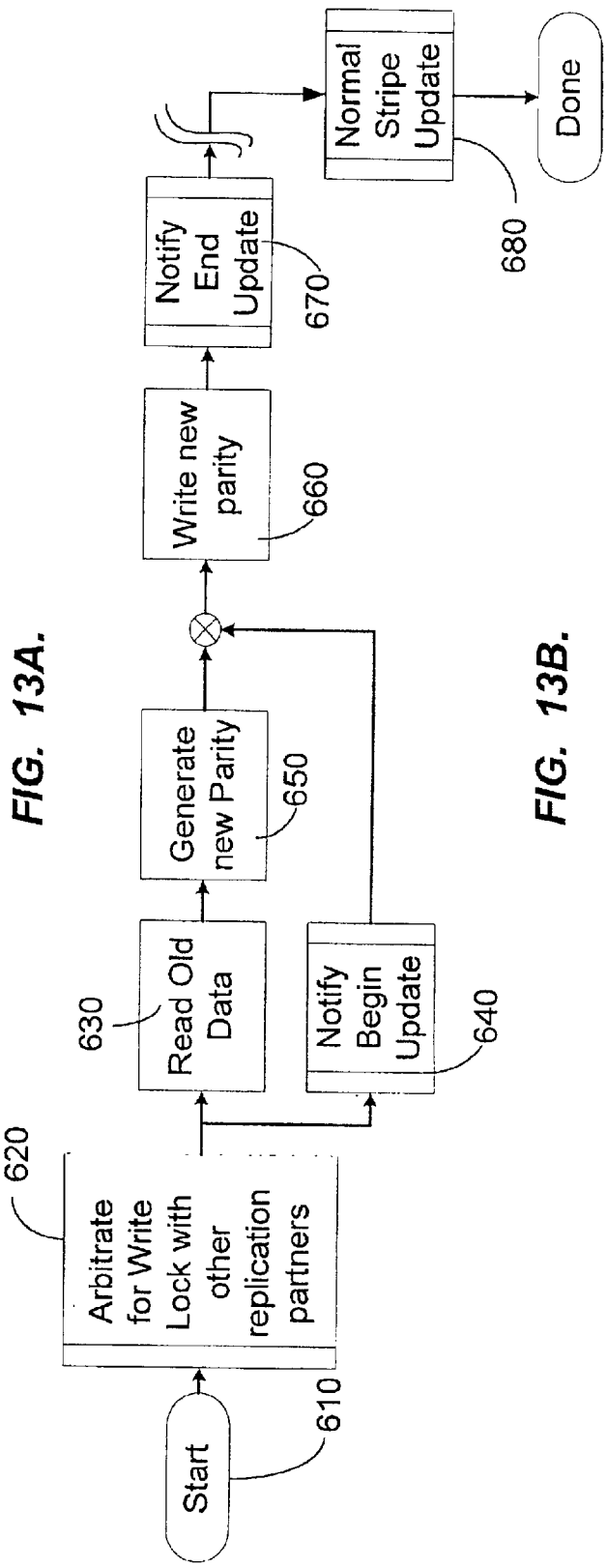
FIG. 13b shows the flow for a recovery process when the AMF updating the stripe as shown in FIG. 13a fails before completing the update according to an embodiment of the present invention.

FIG. 13b shows the general sequence flow for a recovery process when the AMF updating the stripe as shown in FIG. 13a fails before completing the update according to an embodiment of the present invention. When the AMF updating the stripe fails before completing the update, the replication partners assume the responsibility of recovering from the failed update operation. In step 610, the recovery operation begins when one or more of the replication partner AMFs either detects a failure or is notified of a failure. The replication partners arbitrate for ownership of the stripe lock in step 620. The AMF that wins the arbitration (the recovery AMF) is responsible for executing recovery of the failed update operation.

Failure notification typically comes from the inter-controller link (ICL) component. If a controller fails, the AMFs on that controller lose communication with the other AMFs they were sharing the redundancy group with. The ICL periodically sends a 'ping' message to all the other AMFs it is sharing the redundancy group with. If any of these AMFs fails to respond to the ping message, then the AMF that sent the ping message assumes the AMF has failed and begins recovery action. Recovery is also triggered if the ICL encounters a transport failure when sending synchronization or replication messages to the destination AMF.

The recovery process includes two basic steps: recalculation of the stripe parity and rewriting the data. In step 630, the recovery AMF reads all the data for the stripe segments affected by the failed update operation. Concurrent with the data read step 630, the recovery AMF assigns one or more new replication partners and sends a 'begin update' notification to all of its replication partners in step 640. When the data read operation is complete, the recovery AMF generates new parity in step 650. This new parity calculation does not include the new data. It is simply a regeneration of parity for data on the RG member disks.

Once the parity generation step 650 and 'begin update' notification step 640 are complete, the recovery AMF writes the new parity to RG member disks in step 660. After the parity write step 660 is complete, the recovery AMF sends an 'end update' notification to the replication partners in step 670. After some time interval, the cache write back scheduling algorithm causes one of the replication partners to write the new data to the RG member disks in step 680, which is a normal (non-recovery mode) stripe update operation as shown in FIG. 13*a*. The caching functionality is a part of the AMF.

Figure 14A:
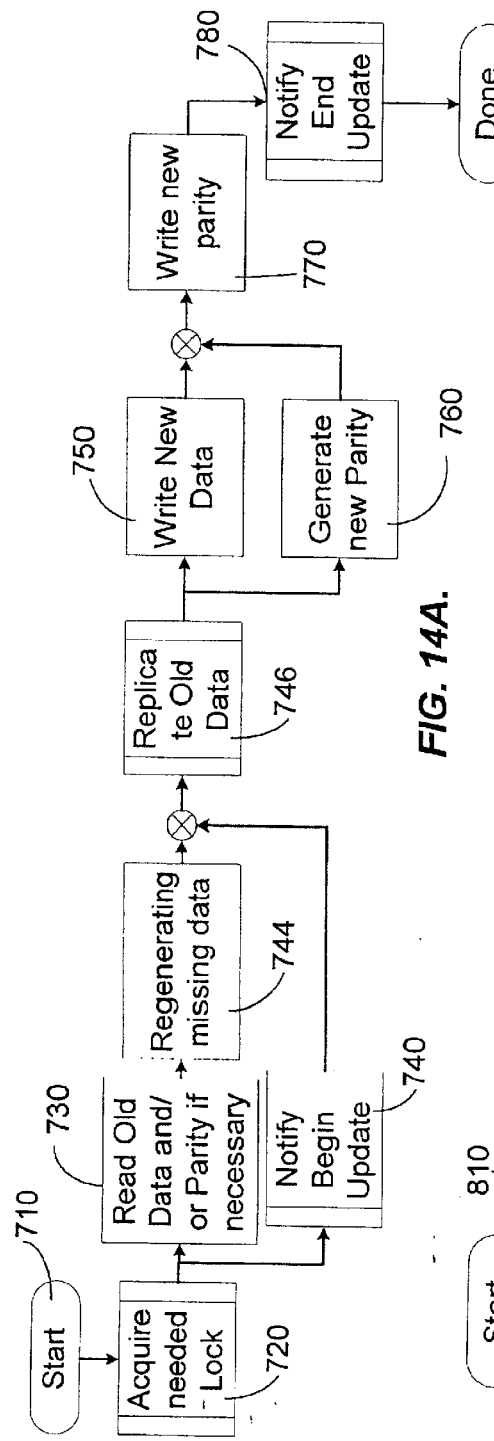
FIG. 14a shows the flow for a write operation when the redundancy group is in a degraded (with a failed drive) mode, according to an embodiment of the present invention.

FIG. 14*a* shows the flow for a write operation when the redundancy group (RG) is in a degraded (with a failed drive) mode, according to an embodiment of the present invention. This sequence is similar to that of the non-degraded case shown in FIG. 13*a*, with the inclusion of regeneration step 744 and replication step 746 as will be described below.

In step 710, the operation is started. For example, a host issues a write command to write data to a resource. Step 720 is the process of acquiring the synchronization lock for the resource required as shown in FIG. 9. In this example the resource is a stripe write lock, but it may also be any other lock as required by the particular operation. After the stripe write lock is acquired, the AMF reads the old data and parity from the RG's disks in step 730.

Concurrent with the disk read operation of step 730, the AMF sends a state notification signal to its replication partners for this resource, in step 740. The replication partners include all other AMFs to which this AMF replicates state information and data for the particular resource. The state notification signal is a 'begin update' type signal, which tells the replication partners that a stripe update has started. The replication partners need to know this information because they will be responsible for cleaning up in the event the writing AMF fails before completing the operation. Once the read of old data and parity step 540 is complete, the AMF regenerates the data that was on the failed disk in step 744. In step 746, the old data, including regenerated data, is replicated to the replication partners. Replication of this data to the replication partners is necessary for recovery in the event the updating AMF fails before completing the operation.

Once replication step 746 is complete, the new data is written to the RG member disks in step 750. Concurrent with the new data write step 750 is the generation of the new parity in step 760. Thereafter, in step 770 the AMF writes the new parity to the RG member disks. Once the parity write operation is complete, the AMF sends an 'end update' notification to its replication partners in step 780. Upon receiving this notification, the replication partners release their state data associated with the stripe update.

Figure 14B:
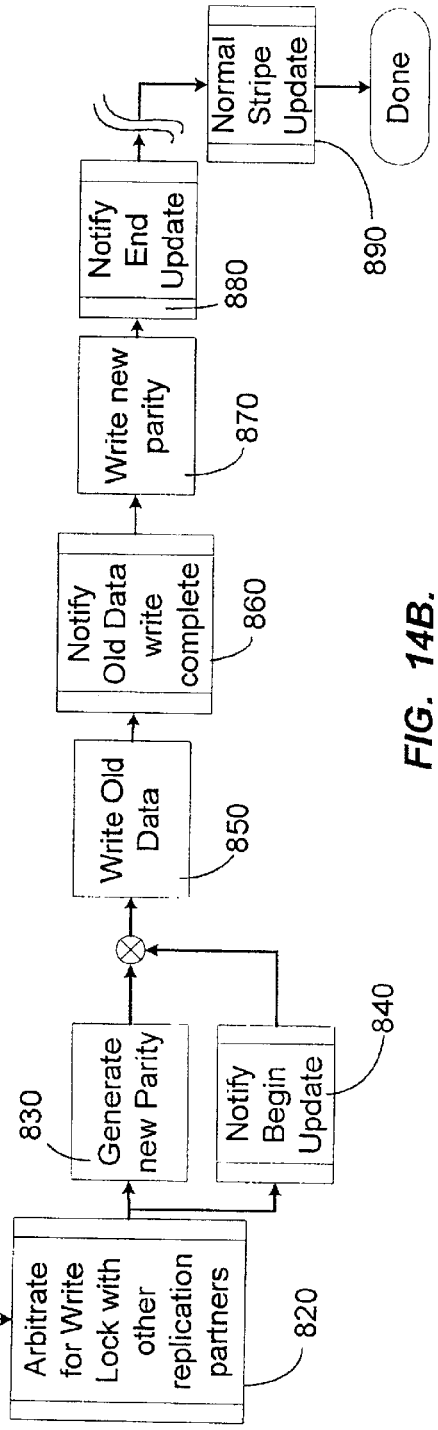
FIG. 14b shows the flow for a recovery process when the AMF updating the stripe as shown in FIG. 14a fails before completing the update according to an embodiment of the present invention.

FIG. 14*b* shows the general sequence flow for a recovery process when the AMF updating the stripe as shown in FIG. 14*a* fails before completing the update according to an embodiment of the present invention. This scenario differs from the non-degraded recovery case shown in FIG. 13*b* in that the recovery AMF uses the replicated old data to reconstruct the RG disk segments that were affected by the updating AMF's failure. When the AMF updating the stripe fails before completing the update, the replication partners assume the responsibility of recovering from the failed update operation. In step 810, the recovery operation begins when one or more of the replication partner AMFs either detects a failure or is notified of a failure, for example by a host. The replication partners arbitrate for ownership of the stripe lock in step 820. The AMF that wins the arbitration (the recovery AMF) is responsible for executing recovery of the failed update operation.

In step 830, new parity is generated from the old data supplied by replication step 746 of FIG. 14*a*. Concurrent with step 830, the recovery AMF assigns one or more new replication partners and sends a 'begin update' notification to all of its replication partners in step 840. In step 850, the old data is written to the disks. In step 860, the replication partners are informed that the old data has been written back to the disks. The replication partners can now discard their copies of the old data. After this event, the recovery sequence is the same as for the non-degraded recovery sequence. Specifically, the new parity to written to the RG member disks in step 870. After the parity write step 870 is complete, the recovery AMF sends an 'end update' notification to the replication partners in step 880. After some time interval, the cache write back scheduling algorithm causes one of the replication partners to write the new data to the RG member disks in step 890, which is a normal (non-recovery mode) stripe update operation as shown in FIG. 13*a*.

Distributed Reconstruction

Figure 15:
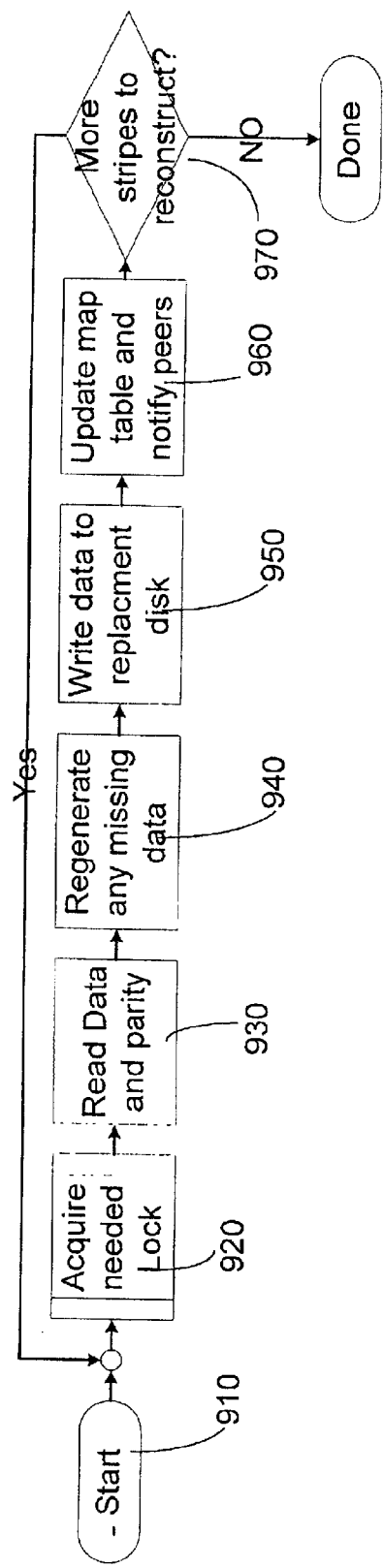
FIG. 15 shows the flow for a background reconstruction process according to an embodiment of the present invention.

FIG. 15 shows the general sequence flow for a background reconstruction process, according to an embodiment of the present invention. Each operation is started in step 910, and the appropriate lock is acquired in step 920, in this case a stripe lock. In step 930, the AMF reads the data and parity for the stripe. In step 940, the AMF regenerates missing data, and in step 950 writes the data to the replacement disk. After writing the data, the AMF updates the map table to reflect the fact that blocks that originally mapped to the failed disk now map to the replacement disk in step 960. The map table maps host logical blocks to RG member disks and blocks on the disks. In step 970, it is determined whether there are any more stripes to reconstruct. This sequence repeats as long as there are more stripes that need to be reconstructed onto the replacement disk.

One advantage of the shared redundancy group management (SRGM) techniques of the present invention is that SRGM allows for distributing reconstruction processing to all AMFs sharing a RG. This results in faster reconstruction times and a general reduction in the increased response times normally encountered by a host during reconstruction. Distributed reconstruction is accomplished by having a subset (or all) of the AMFs sharing a RG coordinate for which stripes each will be responsible for reconstructing. If any of these AMFs fail or shutdown during reconstruction, the remaining AMFs re-arbitrate reconstruction responsibilities. For example, suppose there are N AMFs sharing a redundancy group that needs reconstruction. These AMFs talk to each other (by sending messages) and determine which ones are to participate in the reconstruction, e.g., a subset of N, denote by M. These M AMFs determine reconstruction responsibilities by determining which AMFs will reconstruct which stripe(s). This can be determined by any algorithm. In one embodiment of the invention, for example, each $AMF_i$ reconstructs stripe(s) Mod(S/i), where S is the stripe number.

Distributed RG Expansion

Just as reconstruction is preferably distributed among a subset of the AMFs sharing a RG, so is RG expansion. RG expansion is the addition of drive members to an existing RG. A unique advantage of SRGM is that it allows expansion processing to be distributed to all AMFs sharing a RG. This results in faster expansion times and a reduction in the increased response times normally encountered by a host during expansion.

Distributed expansion is accomplished by having a subset (or all) of the AMFs sharing a RG arbitrate for which stripes they will be responsible for expanding. If any of these AMFs fail or shutdown during expansion then the remaining AMFs re-arbitrate expansion responsibilities. For example, suppose there are N AMFs sharing a redundancy group that needs expansion. These AMFs talk to each other (by sending messages) and determine which ones are to participate in the expansion, e.g., a subset of N, denote by M. These M AMFs determine expansion responsibilities by determining which AMFs will expand which stripe(s). This can be determined by any algorithm. In one embodiment of the invention, for example, each $AMF_i$ expands stripe(s) Mod(S/i), where S is the stripe number.

Figure 16:
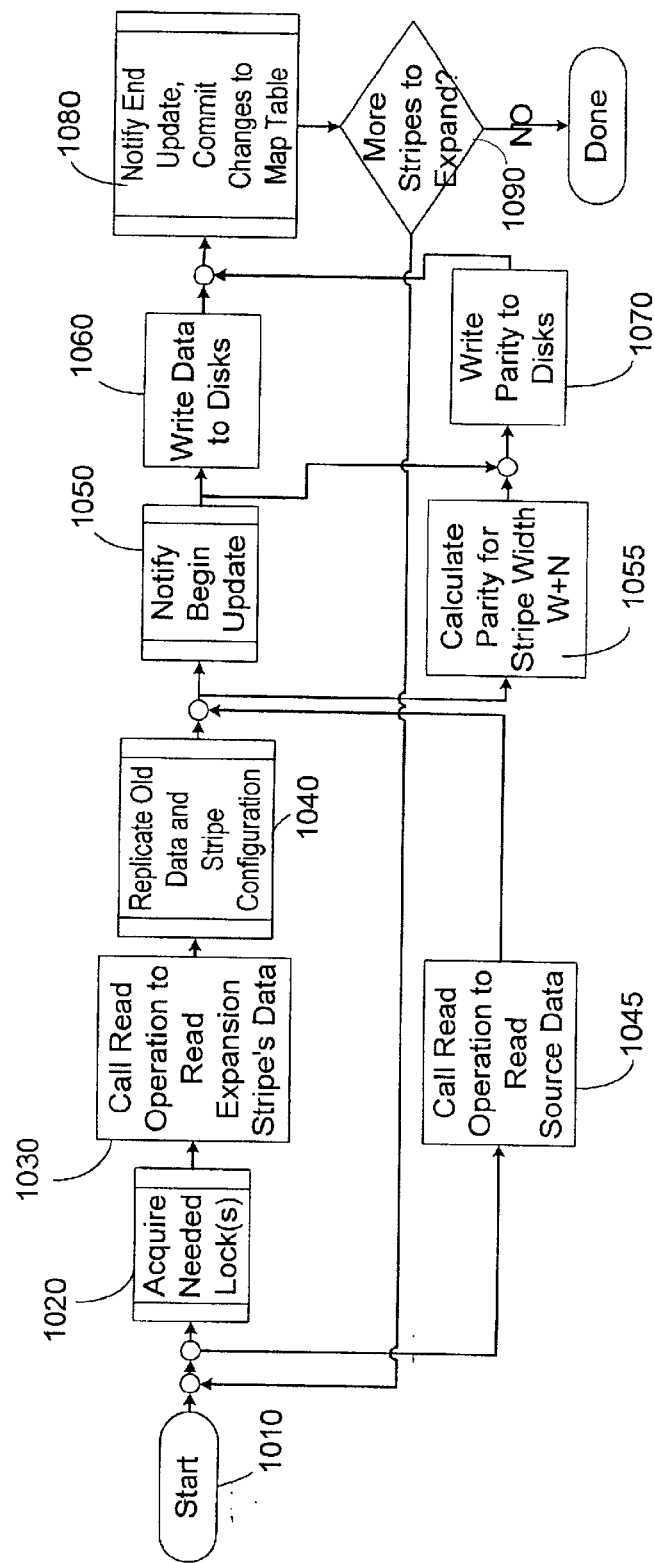
FIG. 16 shows the general sequence flow for a background expansion process according to an embodiment of the present invention.

FIG. 16 shows the general sequence flow for a background expansion process according to an embodiment of the present invention. The process is started in step 1010, and the appropriate stripe lock is acquired in step 1020. The expansion case is different from the preceding examples in that multiple locks must be acquired. An expansion operation will involve 2 or more stripes. One stripe is the expansion stripe whose stripe width will be increased from W to W+N. The other stripes involved are stripes containing host data that will be migrated from those stripes to the expanded stripe.

In step 1030, the data on the stripe to be expanded is read. In step 1040, the data is replicated so that if the operation fails before completion the replication partners will be able to clean up after the failure and continue the expansion process. Concurrent with steps 1030 and 1040, the source data stripe containing data to be migrated to the expanded stripe is read in step 1045. After steps 1040 and 1045 are complete, the AMF notifies its replication partners that it is beginning the expansion stripe update in step 1050. Concurrently, in step 1055, the AMF generates parity information for the expanded stripe.

After the notify begin update has completed, the data for the expanded stripe is written to the disks in step 1060. Once the parity generation step 1055 and the notify begin update step 1050 are complete, the parity is written to the disks in step 1070. Once steps 1060 and 1070 are complete, the AMF notifies its replication partners that the update is complete in step 1080. The replication partners then update their map tables to reflect the increased stripe width and migrated host data. They also discard the data replicated in step 1040. The map table maps host logical blocks to RG member disks and blocks on the disks.

In step 1090, it is determined whether any more stripes are to be expanded by the AMF. If so, the sequence is repeated. This sequence repeats as long as there are more stripes that need to be expanded to utilize the capacity of the new RG member disks. Note that this is process—what makes it a process is the looping that results in step 1090. Steps 1020 through 1090 comprise an operation.

Message Gathering

One issue of concern with SRGM is the processing overhead and IO channel loading associated with the synchronization and replication used to support SRGM. To facilitate the synchronization and replication techniques, ICL (Inter-Controller Link) message gathering is preferably used. Message gathering is, generally, an algorithm that combines many small messages destined for a particular cluster node (i.e. a controller, in which may reside many AMFs) into one big message packet and sends it as one message to the particular node. This dramatically reduces processing overhead and IO channel loading, and contrasts with the approach of sending individual messages to a cluster node.

Figure 17A:
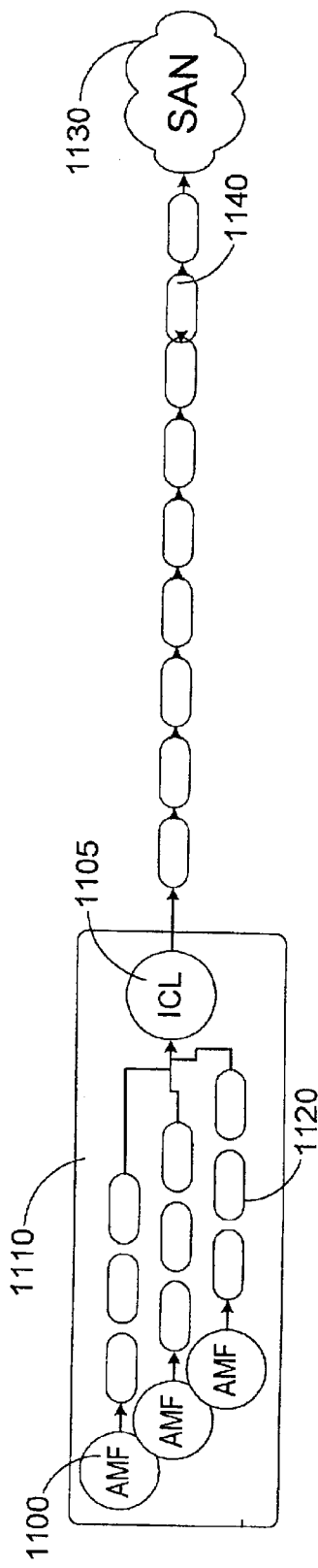
FIGS. 17a and 17b illustrate AMF communication without, and with, the message gathering techniques of the present invention, respectively.

FIG. 17a illustrates AMF communication without the message gathering techniques of the present invention. As shown, a collection of AMFs 1100 and an Inter-Controller Link (ICL) entity 1105 compose a SRGM node 1110. A node is typically a hardware entity such as a controller. ICL 1105 is a software entity that is responsible for routing synchronization and replication messages 1120 from one AiMF to another. As shown in FIG. 17a, only one of many similar nodes is shown as being connected to the SAN 1130.

The AMFs 1100 within node 1110 are sending and receiving synchronization and replication messages with other AMFs on other nodes that share the same redundancy group. Each AMF within node 1110 generates independent streams of synchronization and replication messages, all destined for one or more other nodes on SAN 1130. The messages being sent or received by a particular AMF are independent of the messages being sent or received by other AMFs on the same node. As shown in FIG. 17a, three AMFs 1100 are sending a total of nine messages 1140 to AMFs on other nodes. Without message gathering, ICL 1105 has to send nine messages to other nodes. Also, without message gathering, all synchronization and replication messages generated by all AMFs within a SAN node are processed and sent through the SAN individually. Each message takes a fixed amount of processing overhead, regardless of size.

Figure 17B:
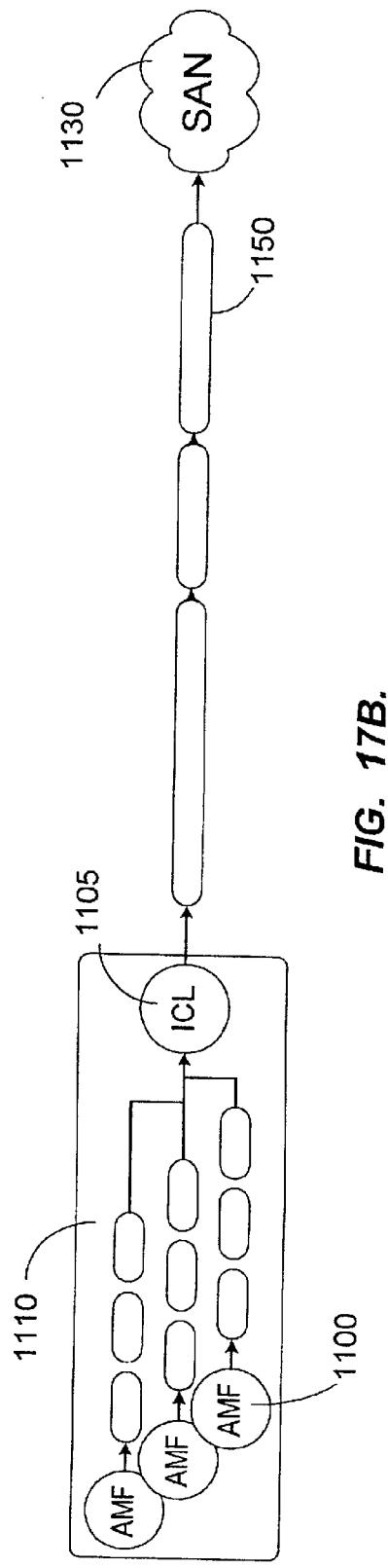

FIG. 17b illustrates AMF communication with the message gathering techniques of the present invention. Message gathering is where many smaller messages destined for a particular node are packed together to form one larger message. This larger message can be sent over SAN 1130 as one message and then unpacked on the receiving node back into the individual messages. For example as shown, the nine messages 1120 are destined for three different nodes. In this example, then, if message gathering is used, ICL 1105 only needs to send three messages 1150—one for each node (not counting itself). ICL 1105 takes on the responsibility of packing and unpacking individual AMF messages.

Arbitration and Distributed Resource Arbitration

FIG. 18a illustrates a basic arbitration process where an AMF requests a lock for a particular resource according to the present invention. AMF 1200 and AMF 1210 each request a lock on a particular resource, and the lock requests are queued in an arbitration queue 1205. The arbitration process for an AMF begins when a request is placed in arbitration queue 1205. The requests are processed in some order such that all requests are satisfied in priority order. The request queue priority is established through any well known algorithm (e.g. FIFO, LIFO). Each requesting AMF must wait until its request is processed to obtain the lock. Each AMF obtains a lock on the resource at successful completion of the arbitration process. An AMF fails to lock the resource if arbitration fails.

FIG. 18b illustrates the general process flow of the generalized arbitration process according to the present invention. Arbitration involves coordinating the resource lock transfer between two AMFs: the requesting AMF 1225 and the AMF 1230 with the resource lock. AMF 1225 sends a Request Lock message to an arbitrator 1220 (the entity performing the arbitration process), which queues the message until a time defined by its priority algorithm. When appropriate, arbitrator 1220 processes the request by issuing a Release Lock message to AMF 1230 which currently has the resource lock. Once it has reached a point where it can safely discontinue use of the resource, AMF 1230 releases the lock and notifies arbitrator 1220 that the lock is released. Arbitrator 1220 then signals requesting AMF 1225 that it has been granted the resource lock. AMF 1225 continues to hold the lock until arbitrator 1220 calls for it to release the resource.

Optimizations of the arbitration queue are possible when one or more AMFs request a read lock for a particular resource. In preferred aspects, the arbitration process simultaneously grants read locks in these situations, as long as command ordering is preserved.

An AMF (or controller) manages the arbitration process for a resource within the redundancy group cluster. This AMF is known as the resource arbitrator. Assignment of the arbitrator for a specific resource can be accomplished using any of multiple methods (e.g. single arbitrator for all resources, load balancing assignment, etc.). The preferred methods for arbitration assignment according to the present invention are based on the number of controllers and the resource range. For cluster configurations with one or two AMFs, the assigned arbitrator is the last AMP with a Write Lock. For cluster configurations with greater than two AMFs, arbitrator assignment is based upon a fixed mapping algorithm based upon the number of AMFs and the resource location (e.g. stripe ID, block ID, etc.).

FIG. 19 illustrates a simplified arbitration process between two AMFs in a cluster configuration for a single resource. First AMF 1300 (AMF #1) issues a Read Lock request 1320 for a resource to second AMF 1310 (AMF #2), which currently has a Write Lock on the resource. AMF#2 issues a Grant Lock (read) message 1330 to AMF #1 indicating that a resource lock has been granted. AMF #1 now has read access to the resource. The sequence continues when AMF #1 issues a Write Lock request 1340 to AMF #2. AMF #2 responds with a Grant Lock (write) message 1350. Continuing, AMF #1 issues a Read Lock request 1360, and since AMF #1 already has a Write Lock, it handles its own arbitration and demotes the Write Lock to a Read Lock. Next, AMF #2 has no locks on the resource at this time, so it does not need to be notified. AMF #2 issues a Read Lock request 1370 to AMF #1, which responds immediately with a Grant Lock (read) message 1380 since the resource supports multiple read locks. For the two-AMF cluster configuration, arbitration with the other AMF is not required when the AMF with a Write Lock is requesting a Read Lock. In all other cases, the second AMF must arbitrate the lock.

Figure 20:
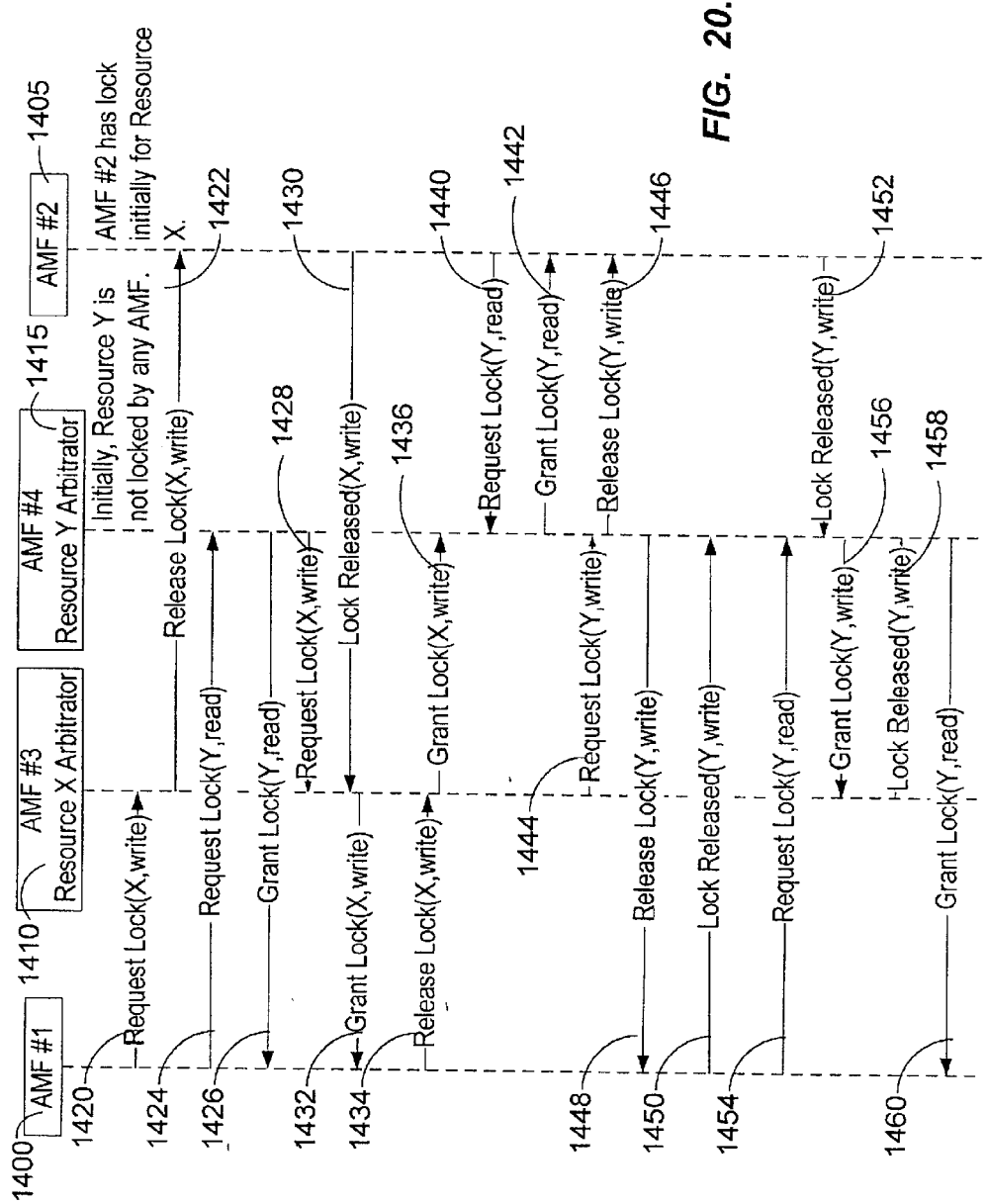
FIG. 20 illustrates exemplary resource arbitration sequences for a cluster including four AMFs according to the present invention.

FIG. 20 illustrates exemplary resource arbitration sequences for a cluster including four AMFs according to the present invention. The preferred arbitrator assignment method for clusters containing three or more AMFs is to select the arbitrator using a fixed mapping algorithm. This has the effect of permanently associating an arbitrator with a single AMF. In the event of AMF resource arbitration failure, the resource arbitrator is reassigned according to the mapping algorithm.

Referring to the FIG. 20, first AMF 1400 (AMF #1) issues a write lock request 1420 to the resource X arbitrator on third AMF 1410 (AMF #3). The arbitrator on AMF #3 issues a release lock request 1422 to second AMF 1405 (AMF #2) to release its lock on the resource X. While the lock request 1420 for resource X is processing, AMF #1 issues a read lock request 1424 for resource Y. Fourth AMF 1415 (AMF #4) is the assigned arbitrator for resource Y. AMF #4 immediately grants a read lock 1426 since no other AMFs currently have a lock. Next, AMF #4 issues a write lock request 1428 for resource X, which is queued by the arbitrator on AMF #3 since it is currently processing write lock request 1420.

AMF #2 sends a lock released message 1430 to AMF #3, which sends a grant lock (write) message 1432 to AMF #1. Embedded within grant lock message 1432 is a flag indicating that AMF #1 should release the lock when finished. This optimization eliminates the need for AMF #3 to send a release lock message to AMF #1. When finished with resource X, AMF #1 sends a lock released message 1434 to AMF #3, which sends a grant lock message 1436 to AMF #4 (which is next in the queue for a write lock on resource X).

The sequence beginning with request lock (read) message 1440 shows a multiple read lock condition. With the reception of the grant lock (read) message 1442, both AMF #2 and AMF #1 have simultaneous read locks on resource Y. The write lock request 1444 sent by AMF #3 causes AMF #4 to issue release lock messages 1446 and 1448 to AMF #2 and AMF #1, respectively. This results in both lock-released message 1450 and lock-released message 1852 being sent to AMF #4. Prior to AMF #4 granting a lock to AMF #3, AMF #1 sends a request read lock message 1454 which is queued by AMF #4. AMF #3 receives the grant write lock message 1456 for resource Y which contains a flag indicating that it should release the lock when complete. AMF #3 issues a lock released message 1458 when done with the resource Y. AMF #4 then issues a grant lock (read) message 1460 notifying AMF #1 that it has obtained a read lock on resource Y.

One benefit of this method for lock management is that the number of messages sent between the AMFs is only a function of the number of locks outstanding. It is not dependent upon the number of AMFs in the cluster configuration. Extending the first method, for example as illustrated in FIG. 19, for the two-controller cluster configuration to support more than three controllers will cause the number of arbitration messages to grow with the number of AMFs in the cluster configuration. Other methods for arbitration optimization are possible, but these two methods present the preferred embodiment for the current invention.

Resource Prefetching

In the preferred embodiment for the current invention, resource arbitration is also optimized through the use of lock prefetch. An AMF can specify additional prefetch resources when arbitrating for a lock. If all or some of the prefetch resources are not locked, the Arbiter will lock them for the AMF as well. Thus, when the AMF requests the lock on these prefetched resources, (at some later time) it can quickly gain the lock (since it already had it).

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A controller device for use in a data storage network having one or more redundancy groups; the controller device comprising:

a first array management function (AMF) that provides access to a first redundancy group in the data storage network; and a communication port for coupling to the network, wherein the first AMF is able to communicate over the network with the first redundancy group and one or more other AMFs in the network that concurrently share access to the first redundancy group;

wherein when the first AMF desires to perform an operation on a first resource in the first redundancy group, the first AMF arbitrates with the one or more other AMFs that share access to the first redundancy group for a lock on the first resource, whereupon the first AMF performs the operation on the first resource and concurrently sends replication data and state information associated with the first resource to the other AMFs such that if the first AMF fails while performing the operation, one of the other AMFs is able to complete the operation.

2. The controller device of claim 1, further comprising:

a second AMF that provides access to a second redundancy group in the data storage network, wherein the second AMF is able to communicate over the network with the second redundancy group and one or more other AMFs in the network that concurrently share access to the second redundancy group;

wherein when the second AMF desires to perform an operation on a second resource in the second redundancy group, the second AMF arbitrates with the one or more other AMFs that share access to the second redundancy group for a lock on the second resource, whereupon the second AMF performs the operation on the second resource and concurrently sends replication data and state information associated with the second resource to the other AMFs that share access to the second redundancy group such that if the second AMF fails while performing the operation, one of the other AMFs that share access to the second redundancy group is able to complete the operation.

3. The controller device of claim 1, further comprising:

a second AMF that provides access to the first redundancy group, wherein the second AMF is able to communicate over the network with the first redundancy group and the one or more other AMFs that share access to the first redundancy group;

wherein when the second AMF desires to perform an operation on a second resource in the first redundancy group, the second AMF arbitrates with the first AMF and the one or more other AMFs that share access to the first redundancy group for a lock on the second resource, whereupon the second AMF performs the operation on the second resource and concurrently sends replication data and state information associated with the second resource to the first AMF and the other AMFs that share access to the first redundancy group such that if the second AMF fails while performing the operation, one of the first AMF and the other AMFs that share access to the first redundancy group is able to complete the operation.

4. The controller device of claim 3, wherein the first and second AMFs communicate over the network.

5. The controller device of claim 1, further comprising a bus port that provides for communication with one of a host and one or more other controller devices over a bus.

6. The controller device of claim 5, wherein the bus port is a PCI port.

7. The controller device of claim 1, wherein the first redundancy group is spread across one or more disks.

8. The controller device of claim 1, wherein the communication port is a fibre-channel port.

9. The controller device of claim 1, wherein the first AMF does not release the lock on the first resource until a one of the other AMFs that share access to the first redundancy group arbitrates for a lock on the first resource.

10. The controller device of claim 1, wherein if the first AMF fails, one of the other AMFs arbitrate for a lock on the first resource, whereupon a second one of the other AMFs obtains the lock and completes the operation.

11. The controller device of claim 1, wherein the operation performed by the first AMF on the first resource includes a plurality of steps, wherein the first AMF performs each step of the operation on the resource, and for each step concurrently sends replication data and state information associated with the first resource to the other AMFs that share access to the first redundancy group, such that if the first AMF fails while performing any of the steps of the operation, one of the other AMFs is able to complete the operation.

12. A controller device for use in a data storage network having one or more redundancy groups; the controller device comprising:

first and second array management functions (AMFs), each providing access to a different redundancy group in the data storage network; and a communication port for communicably coupling the first and second AMFs to the network;

wherein when the first AMF desires to perform an operation on a first resource in a first redundancy group, the first AMF arbitrates with other AMFs in the network that share access to the first redundancy group for a lock on the first resource, whereupon the first AMF performs the operation on the first resource and concurrently sends replication data and state information associated with the first resource to the other AMFs such that if the first AMF fails while performing the operation, one of the other AMFs is able to complete the operation.

13. The controller device of claim 12, wherein when the second AMF desires to perform an operation on a second resource in a second redundancy group, the second AMF arbitrates with other AMFs in the network that share access to the second redundancy group for a lock on the second resource, whereupon the second AMF performs the operation on the second resource and concurrently sends replication data and state information associated with the second resource to the other AMFs that share access to the second redundancy group such that if the second AMF fails while performing the operation, one of the other AMFs that share access to the second redundancy group is able to complete the operation.

14. The controller device of claim 12, further comprising a bus port that provides for communication with one of a host and one or more other controller devices over a bus.

15. The controller device of claim 14, wherein the bus port is a PCI port.

16. The controller device of claim 12, wherein the communication port is a fibre-channel port.

17. The controller device of claim 12, wherein the first AMF does not release the lock on the first resource until a one of the other AMFs that share access to the first redundancy group arbitrates for a lock on the first resource.

18. The controller device of claim 12, wherein if the first AMF fails, one of the other AMFs arbitrates for a lock on the first resource, whereupon a second one of the other AMFs obtains the lock and completes the operation.

19. The controller device of claim 12, wherein the operation performed by the first AMF on the first resource includes a plurality of steps, wherein the first AMF performs each step of the operation on the resource, and for each step concurrently sends replication data and state information associated with the first resource to the other AMFs that share access to the first redundancy group, such that if the first AMF fails while performing any of the steps of the operation, one of the other AMFs is able to complete the operation.

20. A network device for use in a data storage network having one or more redundancy groups, the device comprising:
   a communication bus;
   a first controller executing a first array management function (AMF) that provides access to a first redundancy group in the data storage network, the first controller including a first network port for coupling the first controller to the network, and a first bus port coupling the first controller to the communication bus; and
   a second controller executing a second AMF that provides access to the first redundancy group in the data storage network, the second controller including a second network port for coupling the second controller to the network, and a second bus port coupling the second controller card to the communication bus;
   wherein when the first AMF desires to perform an operation on a first resource in the first redundancy group, the first AMF arbitrates with the second AMF and other AMFs in the network sharing access to the first redundancy group for a lock on the first resource, whereupon the first AMF performs the operation on the first resource and concurrently sends replication data and state information associated with the first resource to the second AMF and the other AMFs sharing access to the first redundancy group such that if the first AMF fails while performing the operation, one of the second AMF and the other AMFs sharing access to the first redundancy group is able to complete the operation.

21. The network device of claim 20, wherein the first AMF arbitrates with the second AMF over the communication bus.

22. The network device of claim 20, wherein the first AMF arbitrates with the second AMF over the network.

23. The network device of claim 20, wherein the communication bus is a PCI bus.

24. The network device of claim 20, wherein the first and second network ports are fibre-channel ports.

25. The network device of claim 20, wherein the first AMF does not release the lock on the first resource until a one of the second AMF and the other AMFs that share access to the first redundancy group arbitrates for a lock on the first resource.

26. The network device of claim 20, wherein if the first AMF fails, one of the second AMF and the other AMFs arbitrates for a lock on the first resource and completes the operation once a lock is obtained.

27. The network device of claim 20, wherein the operation performed by the first AMF on the first resource includes a plurality of steps, wherein the first AMF performs each step of the operation on the resource, and for each step concurrently sends replication data and state information associated with the first resource to the second AMF and the other AMFs that share access to the first redundancy group, such that if the first AMF fails while performing any of the steps of the operation, one of the second AMF and the other AMFs is able to complete the operation.

* * * * *